US005427840A

United States Patent [19]

Imamura et al.

[11] Patent Number: 5,427,840

[45] Date of Patent: Jun. 27, 1995

[54] THERMAL TRANSFER SHEET

[75] Inventors: Hirokatsu Imamura; Masafumi Hayashi; Kouichi Nakamura; Hirokazu Kaneko; Shigeki Umise; Kenichiro Suto; Hiromi Watanabe, all of Tokyo, Japan

[73] Assignee: DAI Nippon Printing Co., Ltd., Japan

[21] Appl. No.: 799,391

[22] Filed: Nov. 27, 1991

[30] Foreign Application Priority Data

| | | | |
|---|---|---|---|
| Nov. 29, 1990 | [JP] | Japan | 2-325468 |
| Feb. 12, 1991 | [JP] | Japan | 3-39038 |
| Feb. 25, 1991 | [JP] | Japan | 3-50111 |
| Feb. 27, 1991 | [JP] | Japan | 3-53698 |

[51] Int. Cl.[6] B32B 3/00

[52] U.S. Cl. 428/195; 428/211; 428/484; 428/488.1; 428/488.4; 428/913; 428/914

[58] Field of Search 428/195, 211, 484, 488.1, 428/488.4, 913, 914

[56] References Cited

U.S. PATENT DOCUMENTS

| | | | |
|---|---|---|---|
| 4,837,199 | 6/1989 | Morishita | 503/227 |
| 5,035,953 | 7/1991 | Kanno | 428/484 |

FOREIGN PATENT DOCUMENTS 0419236 3/1991 European Pat. Off. .

OTHER PUBLICATIONS

I.B.M. Technical Disclosure Bulletin, vol. 26, No. 7A, Dec. 1983, Armonk U.S.A., p. 3449.

A. Aviram:"New Thermal Paper For Printing" Patent Abstracts of Japan, vol. 10, No. 81 (M-465) (2138) 29 Mar. 1986 and JP-A-60-222-294 (Nippon Victor K.K.) 6 Nov. 1985— Abstract.

Patent Abstracts of Japan, vol. 10, No. 81 (M-465) (2138) 29 Mar. 1986 and JP-A-60-222-295 (Nippon Vickor K.K.) 6 Nov. 1985— Abstract.

Patent Abstracts of Japan, vol. 5, No. 206 (M-104), (878) 21 Dec. 1981 and JP-A-56-121-791 (Nippon Denshin Denwa Kisha) 24 Sep. 1981—Abstract.

*Primary Examiner*—Patrick J. Ryan
*Assistant Examiner*—Elizabeth Evans
*Attorney, Agent, or Firm*—Ladas & Parry

[57] ABSTRACT

A co-winding type thermal transfer sheet is constituted by forming on one surface side of a substrate film a heat-fusible ink layer comprising a pigment and a particulate binder, and causing a tracing paper to be peelably bonded onto the heat-fusible ink layer by the medium of an adhesive layer. The thus constituted co-winding type thermal transfer sheet is capable of providing an original image which can be reproduced by use of a blueprint process so as to provide blueprint images having a high precision and a high contrast.

In addition, a co-winding type thermal transfer sheet may also be constituted by forming a heat-fusible ink layer on one surface side of a substrate film and causing a transparent resin sheet to be peelably bonded onto the heat-fusible ink layer by the medium of an adhesive layer containing a cross-linking agent. The thus constituted co-winding type thermal transfer sheet is capable of providing an image excellent in wear resistance on the transparent resin sheet. The transparent resin sheet after the image formation may be used as an OHP (overhead projector) sheet. without contaminating the sheet having no liquid absorbing property.

15 Claims, 3 Drawing Sheets

THERMAL TRANSFER SHEET

BACKGROUND OF THE INVENTION

The present invention relates to a thermal transfer sheet, particularly to a thermal transfer sheet of a novel co-winding type wherein a thermal transfer sheet and a transfer receiving material have been temporarily bonded to each other.

Hitherto, in a case where output from a computer or a word processor is printed by use of a thermal transfer system, there has been used a thermal transfer sheet comprising a substrate film and a heat-fusible ink layer disposed on one surface side thereof.

Such a conventional thermal transfer sheet comprises a substrate film comprising a paper having a thickness of 10 to 20 μm such as a capacitor paper and a paraffin paper, or comprising a plastic film having a thickness of 3 to 20 μm such as a polyester film and a cellophane film. The above-mentioned thermal transfer sheet has been prepared by coating the substrate film with a heat-fusible ink comprising a wax and a colorant such as a dye or a pigment mixed therein, to form a heat-fusible ink layer on the substrate film.

When printing is effected on a transfer receiving material by using such a conventional thermal transfer sheet, the thermal transfer sheet is supplied from a roll thereof, while a continuous or sheet-like transfer-receiving material is also supplied, so that the former and the latter are superposed on each other on a platen. Then, in such a state, heat is supplied to the thermal transfer sheet from the back side surface thereof by means of a thermal-head to melt the ink layer and transfer it to the transfer receiving material, whereby a desired image is formed.

However, even when the above-mentioned conventional thermal transfer sheet is as such intended to be used in a facsimile printer using a conventional thermal (or heat-sensitive) color-developing (or color-forming) paper, the thermal transfer sheet cannot be used in such a large size plotter since the above plotter does not include a conveying device for a transfer-receiving material.

In order to solve the above-mentioned problem, there has been proposed a method wherein a thermal transfer sheet and a transfer-receiving material are temporarily bonded to each other in advance and wound into a roll form so that the thermal transfer sheet may be adapted to a plotter, etc., or the device to be used in combination therewith may be simplified or miniaturized.

However, when an image is formed by using a tracing paper as the transfer-receiving material for the above co-winding type thermal transfer sheet and the tracing paper carrying thereon the thus formed image is used as an original image so as to provide a blueprint image, the line image portion constituting the resultant image is blurred. As a result, there has been posed a problem such that a blueprint image having a high precision cannot be formed. Particularly, when a transparent drum containing therein a light source for a copying machine is heated up to a high temperature on the basis of the accumulation of heat, a portion of the ink constituting the original image is transferred to the drum, thereby to pose a problem such that a large number of spots or dots are produced in the copied image formed after such a transfer of the ink. In addition, there has also been posed a problem such that the thus formed blue-print image only provides a small contrast.

On the other hand, an overhead projection (hereinbelow, sometimes referred to as "OHP") has widely been used in various meetings such as lecture meeting, class or school meeting and explanatory meeting. A transparent sheet (hereinafter, referred to as "OHP sheet") to be used for the OHP comprises a sheet or film having a thickness of several tens of microns to several hundreds of microns and predominantly comprising a transparent resin such as polyester and polypropylene. In order to form an image on such an OHP film or sheet, there has been used a method such as hand writing, printing and thermal (or heat-sensitive) transfer method.

When an image is intended to be formed on the above OHP sheet by use of a thermal transfer method, it is possible to separately feed a thermal transfer sheet and an OHP sheet to a printer. However, since the OHP sheet is generally of a sheet type, it is preferred to use a so-called "co-winding type thermal transfer sheet" comprising an OHP sheet and a thermal transfer sheet which has temporarily been bonded to the surface of the OHP sheet in advance so that these sheets are peelable from each other. When such a co-winding type thermal transfer sheet is used, it is possible to form an OHP image (or image to be used for the OHP) by use of a simple printer.

However, in general, the OHP sheet is considerably hydrophobic and therefore it is difficult to well bond the OHP sheet and the thermal transfer sheet to each other so that they are peelable.

Further, when the thus prepared co-winding type thermal transfer sheet is stored for a certain period of time and thereafter an image is formed on an OHP sheet by use of the thus stored co-winding type thermal transfer sheet, the OHP sheet is contaminated with small fragments of the ink layer of the thermal transfer sheet and the pigment dropped out of the ink layer, so that the entirety of the OHP sheet becomes dark or blackish.

Furthermore, in general, the resultant image formed from the above co-winding type thermal transfer sheet or the resultant OHP sheet carrying thereon such an image has a smooth surface and is lacking in a liquid absorbing property and therefore the heat-fusible ink does not sufficiently penetrate or permeate the OHP sheet, so that the thus formed ink image is liable to be easily peeled from the OHP sheet, i.e., the resultant wear resistance of the ink image is liable to pose a problem. Such a problem has been encountered not only in the OHP sheet or tracing paper but also in most of opaque or colored plastic sheets or films, metal foils, etc..

On the other hand, when an image having at least two colors is intended to be formed by use of a thermal transfer sheet, it is preferred that the thermal transfer sheet and a heat-sensitive color developing paper are temporarily bonded to each other in advance, and the resultant laminate is rolled into a roll form (i.e., a co-winding roll). In the case of such a co-winding type thermal transfer sheet, it is required to have various performances such that the thermal transfer sheet is tightly bonded to the thermal color developing paper so as to provide no wrinkle or deviation, both of these are easily peeled from each other after thermal transfer operation, the ink layer is exactly transferred to the thermal color developing paper in the transfer region, and the ink layer is not transferred to the thermal color developing paper at all in the non-transfer region so that the paper is not contaminated. However, the conventional co-winding type thermal transfer sheet does not fully satisfy such requirements.

In addition, various curtains, outdoor displays, flags, etc., wherein large characters have been written on a cloth or fabric, etc., by use of India ink and a brush, are widely used for the purpose of advertising, publicating or propaganda, or various events or functions such as ceremonial occasions (i.e., coming-of-age ceremonies, weddings, funerals, festivals, etc.) In a case where characters are written on the cloth or fabric by use of the India ink and a brush in the manner as described above, when the same characters are written on a large number of cloths or fabrics, a printing process may be used. However, when some characters are written for the purpose of a funeral which cannot be expected in advance, and different characters are written on different cloths or fabrics, considerable trouble is required. Further, at present, it is difficult to find a person who is capable of well writing (i.e.., is good at handwriting), and therefore many problems are liable to occur.

SUMMARY OF THE INVENTION

An object of the present invention is to provide a co-winding type thermal transfer sheet which is capable of providing an original image which can be reproduced by use of a blueprint process so as to provide blueprint images having a high precision and a high contrast.

Another object of the present invention is to provide a co-winding type thermal transfer sheet which comprises a sheet having no liquid absorbing property such as an OHP sheet temporarily bonded to a thermal transfer sheet in a good state, and is capable of providing images excellent in wear resistance (or resistance to rubbing) without contaminating the sheet having no liquid absorbing property.

A further object of the present invention is to provide a co-winding type thermal transfer sheet which is excellent in both of an adhesion property and a peeling property, is capable of providing a printed image having a high resolution, and is capable of providing a printed image which has two or more colors and is free of ground staining (or background staining).

According a first aspect of the present invention, there is provided a thermal transfer sheet comprising:

a substrate film, one side surface of which is provided with a heat-fusible ink layer comprising a pigment and a particulate binder, and a tracing paper peelably bonded to the heat-fusible ink layer by the medium of an adhesive layer.

According to a second aspect of the present invention, there is provided a thermal transfer sheet, comprising:

a substrate sheet, one side surface of which is provided with a heat-fusible ink layer, and a paper impregnated with a resin which has a light beam transmittance of 40 to 65% in the wavelength range of 500 to 600 nm, and is peelably bonded to the heat-fusible ink layer by the medium of an adhesive layer.

According a third aspect of the present invention, there is provided a thermal transfer sheet comprising:

a substrate film, one side surface of which is provided with a heat-fusible ink layer containing heat resistant particles, and a tracing paper peelably bonded to the heat-fusible ink layer by the medium of an adhesive layer.

According to a fourth aspect of the present invention, there is provided a thermal transfer sheet comprising:

a substrate film, one side surface of which is provided with a heat-fusible ink layer, and a synthetic paper including minute voids and a high smoothness which is peelably bonded to the heat-fusible ink layer by the medium of an adhesive layer.

According to the above first to fourth aspects, no blurring occurs in the resultant image even when an image provided by such a thermal transfer sheet is used as an original image to further be reproduced, and the resultant blueprint images formed by such reproduction have a high precision and a high contrast.

According to a fifth aspect of the present invention, there is provided a thermal transfer sheet comprising:

a substrate film, one side surface of which is provided with a heat-fusible ink layer, and a transparent resin sheet peelably bonded to the heat-fusible ink layer by the medium of an adhesive layer comprising a cross-linking agent.

According to a sixth aspect of the present invention, there is provided a thermal transfer sheet comprising:

a substrate film, one side surface of which is provided with a heat-fusible ink layer, and a sheet having no liquid absorbing property which is peelably bonded to the heat-fusible ink layer and has an adhesive layer on an image-forming side surface thereof.

According to the above fifth and sixth aspect of the present invention, there can be provided a co-winding type thermal transfer sheet which comprises a sheet having no liquid absorbing property and a thermal transfer sheet temporarily bonded to each other in a good state, is capable of preventing the contamination of the sheet having no liquid absorbing property, and is capable of providing images excellent in wear resistance.

According to a seventh aspect of the present invention, there is provided a thermal transfer sheet comprising:

a substrate film, one side surface of which is provided with a heat-fusible ink layer and a fabric peelably bonded to the heat-fusible ink layer by the medium of an adhesive layer.

According to the above seventh aspect, well shaped large size characters may easily be produced by everyone as long as a large size thermal transfer printer is used for the purpose of printing.

According an eighth aspect of the present invention, there is provided a thermal transfer sheet, comprising:

a substrate sheet, one side surface of which is provided with a heat-fusible ink layer, and a thermal color developing paper which is peelably bonded to the heat-fusible ink layer by the medium of an adhesive layer comprising adhesive particles According to the above eighth aspect, the thermal transfer sheet and the heat sensitive (or thermal) color-developing paper are finely bonded to each other so that wrinkels (or creases) or deviation does not occur. In addition, after the thermal transfer operation is actually effected, the thermal transfer sheet and the color developing paper are easily separated from each other, the ink layer is precisely transferred to the thermal color-developing paper in a trasnfer region and is not transferred thereto at all in a non-transfer region and therefore the thermal color-developing paper is not contaminated.

According a ninth aspect of the present invention, there is provided a thermal transfer sheet comprising:

a substrate film, one side surface of which is provided with a heat-fusible ink layer, and a transfer-receiving material peelably bonded to the heat-fusible ink layer by the medium of an adhesive layer;

wherein the transfer receiving material has a surface which is to be subjected to a printing operation and has been provided with a printed image in advance.

According to the above ninth aspect, the printed image or pattern is not discernible by the naked eye and the thus constituted thermal transfer sheet cannot be discriminated from a co-winding type thermal transfer sheet comprising white paper having no printed pattern, on the basis of the appearances thereof. Accordingly, in a case where an absolutely secret and important document or a printed matter which should not be forged or altered is prepared, when the above thermal transfer sheet comprising the transfer-receiving material provided with the printed pattern is used, it is easy to prevent the leakage of a secret, the forgeing or alternation, etc.

According a tenth aspect of the present invention, there is provided, a thermal transfer sheet, comprising:

a substrate sheet, one side surface of which is provided with a heat-fusible ink layer, and a transfer-receiving material which is peelably bonded to the heat-fusible ink layer by the medium of an adhesive layer;

wherein the transfer-receiving material has been subjected to an antistatic treatment printing in advance.

According to the above tenth aspect, the pieces or fragments of the ink layer or a pigment which can be dropped from the ink layer is prevented from attaching to the transfer-receiving material, and therefore clear images free of such a contamination may be obtained.

According an eleventh aspect of the present invention, there is provided a thermal transfer sheet, comprising:

a substrate sheet, one side surface of which is provided with a heat-fusible ink layer substantially comprising a thermoplastic resin, and a transfer-receiving material which is peelably bonded to the heat-fusible ink layer by the medium of an adhesive layer.

According to the above eleventh aspect, there may be provided an image which is excellent in heat resistance and wear resistance.

According to twelfth aspect of the present invention, there is provided, a thermal transfer sheet, comprising:

a substrate sheet, one side surface of which is provided with a heat-fusible ink layer, and a transfer-receiving material which is peelably bonded to the heat-fusible ink layer by the medium of an adhesive layer;

wherein the heat-fusible ink layer comprises a pigment and a particulate binder.

According to the above twelfth aspect, there may be provided an image which is excellent in wear resistance, and no blurring occurs in the resultant image even when an image provided by such a thermal transfer sheet is used as an original image to further be reproduced, and the resultant blueprint images formed by such reproduction have a high precision and a high contrast.

These and other objects, features and advantages of the present invention will become more apparent upon a consideration of the following description of the preferred embodiments of the present invention taken in conjunction with the accompanying drawings.

DESCRIPTION OF PREFERRED EMBODIMENTS

Hereinbelow, the present invention will be described in detail with reference to preferred embodiments thereof.

Figure 1:
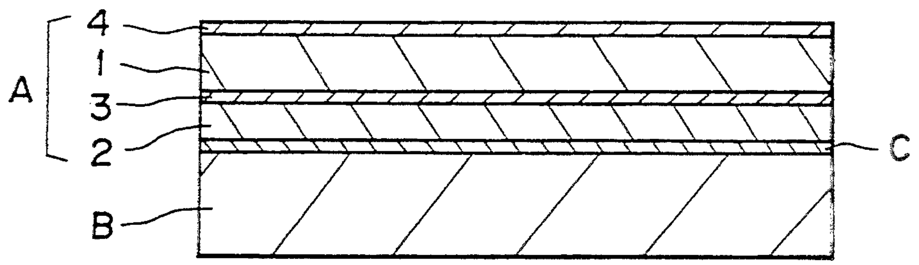
FIG. 1 is a schematic sectional view showing a thermal transfer sheet according to an embodiment of the present invention.

FIG. 1 is a schematic sectional view showing a thermal transfer sheet according to a preferred embodiment of the present invention.

In a first embodiment, as shown in FIG. 1, a thermal transfer sheet according to the present invention comprises a thermal transfer sheet A and a transfer-receiving material B which is peelably bonded to the thermal transfer sheet A by an adhesive layer C.

As shown in FIG. 1, the above thermal transfer sheet A comprises a substrate film 1 and a heat-fusible ink layer 2 disposed thereon comprising a pigment and a binder in a particulate form. It is possible to dispose a wax layer 3 between the substrate film 1 and the ink layer 2, and/or to dispose a slip (or slipping) layer 4 on the back surface of the substrate film 1, as desired.

The substrate film 1 to be used in the first embodiment of the present invention may be one selected from those used in the conventional thermal transfer sheet. However, the above-mentioned substrate film 1 is not restricted to such an example and can be any of other films.

Preferred examples of the substrate film 1 may include: plastic films or sheets such as those comprising polyester, polypropylene, cellophane, polycarbonate, cellulose acetate, polyethylene, polyvinyl chloride, polystyrene, nylon, polyimide, polyvinylidene chloride, polyvinyl alcohol, fluorine containing resin, chlorinated rubber, and ionomer resin; papers such as capacitor paper and paraffin paper; non woven fabric; etc.. The substrate film 1 can also comprise a combination or laminate of two or more species selected from the above-mentioned films.

The substrate film 1 may preferably have a thickness of e.g., 2 to 25 μm, while the thickness can appropriately be changed corresponding to the materials thereof so as to provide suitable strength and heat conductivity.

The heat-fusible ink layer 2 to be disposed on the above substrate film 1 comprises a pigment and a particulate binder, and can also contain one selected from various additives, as desired. As a matter of course, for the purpose of black mono-color printing, the pigment may preferably comprise carbon black. For the purpose of multi-color printing, the pigment may comprise a chromatic pigment such as cyan pigment, magenta pigment and yellow pigment. It is generally preferred to use such a pigment in an amount of about 5 to 70% in the ink layer.

The binder may predominantly comprise a wax or may comprise a mixture of a wax and another component such as drying oil, resin, mineral oil, and derivatives of cellulose and rubber.

Representative examples of the wax may include; microcrystalline wax, carnauba wax, paraffin wax, etc.. In addition, specific examples of the wax may includes; various species thereof such as Fischer Tropsch wax, various low-molecular weight polyethylene, Japan wax, beeswax, whale wax, insect wax, lanolin, shellac wax, candelilla wax, petrolactam, partially modified wax, fatty acid ester, and fatty acid amide. In the present invention, it is also possible to mix a thermoplastic resin having a relatively low melting point in the above-mentioned wax so as to enhance the adhesion property of the ink to a transfer receiving material.

In order to form the heat-fusible ink layer 2 on the substrate film 1, it is preferred to use an emulsion ink comprising a mixture of an emulsion obtained by emulsifying or dispersing the binder predominantly comprisng the above wax in an aqueous medium capable of containing an alcohol, etc.; and an aqueous dispersion containing a pigment. More specifically, it is preferred to use a method wherein such an emulsion ink is applied to the substrate film 1 and the resultant coating is dried at a temperature at which the emulsion particles may retain their particulate shape. The binder to be used for such a purpose may preferably comprise a thermoplastic resin in combination with the wax, and it is preferred to use the thermoplastic resin as an emulsion in an aqueous medium in the same manner as described above. It is preferred to use the thermoplastic resin in an amount of 10 to 100 wt.parts with respect to 100 wt.parts of the wax. In general, the ink layer to be formed in such a manner may preferably have a thickness of about 0.5 to 20 μm.

In the formation of the above ink layer 2, it is also possible to use a method wherein a transparent layer comprising a wax is formed on the surface of the substrate film 1 in advance so that a transferred image to be formed after the transfer operation may have a surface layer. It is also preferred that such a wax layer is formed from a wax emulsion as described above and is one wherein the emulsion particles retain their shapes. In general, such a wax layer may have a thickness of about 0.2 to 5 μm.

The transfer-receiving material B may comprise a tracing paper such as parchement paper and plastic film. The trasnfer receiving material may be in the form of sheets such as A-size and B-size, but may preferably be in the form of a continuous sheet having a desired width.

The adhesive layer C for temporarily bonding the thermal transfer sheet A and the transfer-receiving sheet B to each other can comprise any of adhesives known in the prior art, but may preferably comprise a wax and an adhesive resin having a low glass transition temperature.

Such an adhessive layer may preferably have an adhesive strength (or adhesive force) in the range of 300 to 2000 g. Such an adhesive strength may be measured by cutting sample having a width of 25 mm and a length of 55 mm, and subjecting the sample to measurement by means of a surface friction meter (HEIDON-14, mfd. by Shinto Kagaku K. K.) at a pulling speed of 1800 mm/min.

If the adhesive strength is below the above range, the adhesive strength between the thermal transfer sheet and the transfer-receiving material is too low, both of these are liable to be peeled from each other, and the thermal transfer sheet is liable to be wrinkled. If the adhesive strength is above the above range, the adhesive strength is sufficient but the ink layer is liable to be trasnferred to the transfer-receiving material even in the non-printing region so as to contaminate the trasnfer-receiving material.

However, in a case where the thermoplastic resin content in the ink layer is 9 wt. % or higher in terms of solid content in the ink layer, e.g., in the case of ethylene vinyl acetate copolymer having a vinyl acetate content of 28% even when the adhesive strength of the adhesive layer to the transfer-receiving layer is 1300 to 2000 g, there may be obtained a thermal transfer sheet capable of preventing the contamination of the transfer-receiving material.

The above-mentioned adhesive resin may preferably have a glass transition temperature in the range of −90° to −60° C. Specific examples of such an adhesive resin may include a rubber-type adhesive resin, an acrylic-type adhesive resin, and a silicone type adhesive resin. In view of morphology, adhesives may include a solvent-solution type, an aqueous-solution type, a hot-melt type, and an aqueous or oily emulsion type. Each of these types can be used in the present invention, but an adhesive particularly preferably used in the present invention is an acrylic aqueous emulsion type adhesive.

When the above-mentioned adhesive resin is used alone, excellent adheison may be provided, but the peelability of the transfer-receiving material is insufficient and uneven (or ununiform). As a result, when an unexpected force is applied to the thermal transfer sheet prior to the thermal transfer operation, e.g., at the time of production, storage, or transportation thereof, the ink layer of the thermal transfer sheet is transferred to the transfer-receiving material to cause ground staining. Further, the cutting of the ink layer is deteriorated at the time of thermal transfer operation, and the ink layer is transferred to the periphery of a region which has been provided with heat by means of a thermal-head, whereby the resolution of the transferred image is deteriorated.

In the above first embodiment of the present invention, it has been found that when an emulsion of a wax which is similar to that used in the formation of the ink layer is added to the emulsion adhesive resin, the adhesion may be regulated to a preferred range, the above problem of the ground staining is solved, the cutting of the adhesive layer C is improved, so that the resolution of the transferred image is remarkably improved.

Further, when an emulsion of a resin having a high glass transition temperature is further added to the emulsion of the adhesive resin, the adhesion may be regulated to a preferred range.

The above-mentioned resin emulsion may preferably comprise, a thermoplastic resin such as ehtylene-vinyl acetate copolymer, ethylene-acrylic acid ester copolymer, polyethylene, polystyrene, polypropylene, polybutene, vinyl chloride resin, vinyl chloride vinyl acetate copolymer, and acrylic resin. Among these, an acrylic emulsion is particularly preferred. Such a resin may preferably have a glass transition temperature higher than that of the above-mentioned adhesive resin (e.g. 60° C. or higher), and can also be a heat cured resin in some cases.

The weight ratio between the adhesive resin and the wax may preferably be (1:0.5) to (1:4). If the ratio is not within such a range, various problems as described above may undesirably be posed.

The adhesive layer C comprising the above-mentioned components can be disposed on the surface of the transfer-receiving material B, but a certain adhesiveness remains on the resultant printed matter in such a case. Accordingly, the adhesive layer may preferably be disposed on the surface of the ink layer 2 of the thermal transfer sheet. In such a case, since the adhesive resin is used in the form of an aqueous-emulsion, the ink layer is not substantially impaired. The coating method or drying method for the emulsion is not particularly be restricted.

The above adhesive layer may preferably have a thickness of 0.1 to 10 $\mu m$ (i.e., 0.1 to 1.5 $g/m^2$ in terms of coating amount of solid content).

The thermal transfer sheet A and the transfer-receiving material B may preferably be bonded to each other by continuously bonding the transfer-receiving material to the surface of the thermal transfer sheet while forming an adhesive layer on the surface of the ink layer, and winding the resultant laminate into a roll form. When such a laminte is wound into a roll, it is possible to dispose the transfer-receiving material outside or to dispose the thermal transfer sheet outside. In addition, it is also possible to cut such a lamiante into a sheet form.

In a second embodiment of the thermal tranfer sheet according to the present invention, a tracing-paper as the transfer-receiving material B comprises a paper impregnated with a resin which has a light beam transmittance of 40 to 65% in a wavelength range of 500 to 600 nm. When the tracing-paper having such a light beam transmittance is used, the resultant blueprint image can be caused to have a higher contrast. In the present invention, the transmittance may be measured by means of a measurement device (Shimazu Spectrophotometer UV-3100) equipped with an integrating sphere reflection attachment by receiving a scattered light by use of barium sulfate as a reference. In this mesurement, the following measurement conditions may be used;

speed: 700 nm/min.
slit width in the measruement device: 5.0 nm
light source: tungsten lamp or deuterium lamp.

The tracing paper having such a characteristic is available under a tradename such as Vellum TB, Yupo TPG, Ohji OB Trace, SK Trace HC, and SK Trace DC, and may be used for such a purpose. The tracing paper may be in the form of a sheet of A-size or B-size, or in the form of a continuous sheet having an arbitrary width.

In the thermal transfer sheet according to the above second embodiment, the substrate film, the heat-fusible ink layer and the adhesive layer may be the same as those used in the first embodiment as described hereinabove, and therefore the detailed description thereof is omitted.

In a third embodiment of the thermal transfer sheet according to the present invention, the heat-fusible ink layer 2 shown in FIG. 1 contains heat resistant particles.

More specifically, the heat-fusible ink layer according to this embodiment comprises a pigment, a binder and heat-resistant particles and can also contain one selected from various additives, as desired.

In this embodiment, the pigment and the binder may be the same as those used in the first embodiment as described above.

The heat-resistant particles to be used in the present invention may comprise an inorganic filler such as talc, clay, calcium carbonate, and silica; a plastic or a pigment, etc.. Specific examples thereof may include; Hydrotalsite DHT-4A (mfd. by Kyowa Kagaku Kogyo), Talcmicroace L-1 (mfd. by Nihon Talc), Teflon Rubron L-2 (mfd. by Daikin Kogyo), Fluorinated Graphite SCP-10 (mfd. by Sanpo Kagaku Kogyo), Graphite AT40S (mfd. by Oriental Sangyo), and fine particles such as precipitated barium sulfate, cross-linked urea resin powder, cross-linked melamine resin powder, cross-linked styrene-acrylic resin powder, cross-linked amino resin powder, silicone resin powder, wood meal, molybdenum disulfide, and boron nitride. It is preferred to use such heat resistant particles in an amount of about 3 to 20 wt. % in the ink layer. If the amount of the heat resistant particles contained in the ink layer is too small, the effect thereof on the improvement in the heat resistance of the ink layer becomes insufficient. On the other hand, such an amount is too large, the degree of blackness of the ink is lowered.

In this embodiment, the heat-fusible ink layer may be formed in the same manner as in the case of the first embodiment as described above.

In the thermal transfer sheet according to the above third embodiment, the substrate film, the adhesive layer and the transfer-receiving material may be the same as those used in the first embodiment as described hereinabove, and therefore the detailed description thereof is omitted.

In a fourth embodiment of the thermal transfer sheet according to the present invention, the tracing paper as the transfer-receiving material B comprises a synthetic paper having minute voids and a high smoothness.

The synthetic paper to be used for such a purpose may include those having avoid (or void volume) in the range of 1 to 40%. Specific examples thereof may include: commercially available synthetic papers such as that sold under the trade names of Yupo (mfd. by Ohji Yuka Goseishi K. K.). The synthetic paper to be used for such a purpose may preferably have a smoothness of 50 to 200 sec., a rigidity of 10 to 100 g, a tear strength (or tear propagation strength) of 10 to 60 g, and/or a thickness of 50 to 200 $\mu m$.

The synthetic paper to be used for such a purpose may also be one which comprises an intermediate layer predominantly comprising a resin such as polypropylene resin and being obtained by adding an inorganic filler to such a resin and subjecting the resultant raw material to biaxial orientation; and uniaxially oriented surface layers disposed on both surface sides thereof. The synthetic paper to be used in this embodiment may appropriately be selected from those having a void volume and a high smoothness in the ranges as described above. If the void volume and/or the smoothness are below the above range, the resultant printing performance may undesirably be insufficient. On the other hand, the void volume and/or the smoothness exceeding the range as described above, the transfer-property of the heat-fusible ink layer may undesirably be insufficient.

In the thermal transfer sheet according to the above fourth embodiment, the substrate film, the heat-fusible ink layer and the adheisve layer may be the same as those used in the thermal transfer sheet according to the first embodiment as described hereinabove, and therefore the detailed description thereof is omitted.

In a fifth embodiment of the thermal transfer sheet according to the present invention, the transfer-receiving material B comprises a sheet of a transparent resin, and the adhesive layer C comprises an adhesive containing a crosslinking agent.

The transfer-receiving material B to be used in the fifth embodiment may be any of various transparent resin sheets which have been used as an OHP sheet in the prior art, Specific examples thereof may include: plastic films or sheets such as those comprising polyester, polypropylene, cellophane, polycarbonate and cellulose acetate. The transparent resin sheet may preferably have a thickness in the range of several tens of microns to several hundreds of microns.

The adhesive resin to be used in the fifth embodiment may preferably be used as a solution in an organic solvent such as toluene, xylene, methyl ethyl ketone, ethyl acetate and butyl acetate which contains a solid content of about 5 to 40 wt. %. When such an organic solvent is used, a good tackiness may be imparted to the resultant transparent resin sheet. However, when such a transparent resin sheet is used as such, the surface thereof remains somewhat tacky. Accordingly, it is preferred to use an appropriate crosslinking agent in combination with the transparent resin sheet of such a crosslinking agent may be any of those known in the prior art, but preferred examples thereof may include polyisocyanates such as toluene diisocyanate, isocyanurate, and isophorone diisocyanate, trimethylolpropane adduct. The crosslinking agent may preferably be used in an amount of 5 to 10 wt.parts with respect to 100 wt.parts of the adhesive agent. If the amount of the crosslinking agent to be used for such a purpose is too small, the surface of the transparent resin sheet remains somewhat tacky. On the other hand, such an amount is too large, the adhesive property may undesirably be reduced. The above adhesive layer may preferably have a thickness of 0.1 to 10 $\mu$m (i.e., 0.1 to 5 g/m$^2$ in terms of coating amount of solid content). When the adhesive layer C is formed by use of such an adhesive agent, the adhesive agent is prevented from being transferred to the transparent resin sheet, and therefore it is possible to prevent occurrence of tackiness in the surface of the transparent resin sheet separated from the thermal transfer sheet.

The method of forming the adhesive layer C by use of the adhesive agent containing such a crosslinking agent, the range in which the adhesion strength between the adhesive layer C and the transparent resin sheet as the transfer-receiving material is to be regulated, etc., may be the same as those in the case of the first embodiment as described above.

In the thermal transfer sheet according to the above fifth embodiment, the substrate film and the heat-fusible ink layer may be the same as those used in the thermal transfer sheet according to the first embodiment as described hereinabove, and therefore the detailed description thereof is omitted.

In a sixth embodiment of the thermal transfer sheet according to the present invention, the transfer-receiving material B comprises a transparent resin sheet which has been subjected to an antistatic treatment.

The transparent resin sheet to be used in the sixth embodiment may also be the same as that used in the above fifth embodiment.

The antistatic treatment of the transparent resin sheet may be effected by use of a known antistatic agent such as those of anion type, nonion type and cation type. In such a treatment, the antistatic agent may be kneaded in the sheet at the time of the formation of the resin sheet, or an antistatic coating material may be applied onto the surface of the sheet and then dried. The antistatic performance may preferably be that corresponding to a surface resistance (or surface resistivity) of about $10^7$ to $10^{10}$ $\Omega$·cm. If the surface resistance exceeds such a range, the fragment or piece of the ink layer or the pigment may be adsorbed to the surface of the resin sheet under the action of an electrostatic force so that the surface of the resin sheet may be contaminated.

In the thermal transfersheet according to the above sixth embodiment, the substrate film, the heat-fusible ink layer and the adhesive layer may be the same as those used in the thermal transfer sheet according to the first embodiment as described hereinabove.

The adhesive layer to be used in the sixth embodiment may also be the same as that used in the above fifth embodiment.

Figure 3:
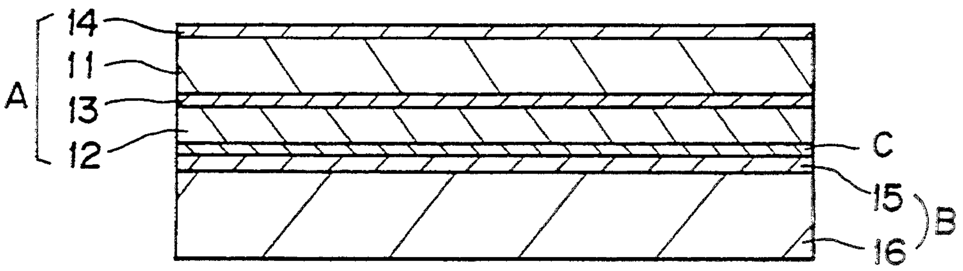
FIG. 3 is a schematic sectional view showing a thermal transfer sheet according to another embodiment of the present invention.
Figure 4:
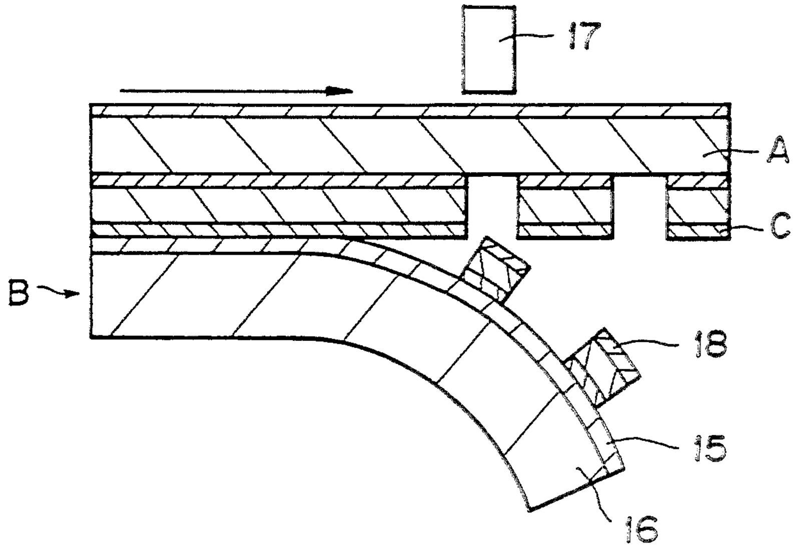
FIG. 4 is a schematic sectional view showing the thermal transfer sheet according to the present invention in a printing state.

FIG. 3 is a schematic sectional view showing a thermal transfer sheet according to a seventh embodiment of the present invention.

In the seventh embodiment, as shown in FIG. 3, a thermal transfer sheet according to the present invention comprises a thermal transfer sheet A and a trasnfer-receiving material B which is peelably bonded to the thermal transfer sheet A by an adhesive layer, C.

As shown in FIG. 3, the above thermal transfer sheet A comprises a substrate film 11 and a heat-fusible ink layer 12 disposed thereon comprising a pigment and a binder predominantly comprising a wax. It is possible to dispose a separation layer 13 comprising a wax between the substrate film 11 and the ink layer 12, and/or to dispose a slip (or slipping) layer 14 on the back surface of the substrate film 11, as desired.

The substrate film 11, the heat-fusible ink layer 12, the separation layer 13 and the slip layer 14 to be used in the seventh embodiment may be the same as the substrate film 1, the heat-fusible ink layer 2, the separation layer 3 and the slip layer 4 used in the first embodiment as described above, and therefore the detailed description thereof is omitted. In addition, the adhesive layer C may also be the same as that used in the above first or fifth embodiment.

The seventh embodiment is characterized in that the transfer-receiving material B comprises a substrate 16 having no liquid absorbing property and an adhesive layer 15 disposed thereon. When such an adhesive layer 15 is disposed, the image to be formed one the adhesive layer is excellent in wear resistance, even when the transfer-receiving material has no liquid absorbing property.

The substrate (or base material) 16 to be used for the transfer-receiving material B may comprise a transparent sheet or film to be used for an OHP sheet or a tracing paper. Specific examples thereof may include: plastic films or sheets such as those comprising polyester, polypropylene, cellophane, polycarbonate, cellulose acetate, polyethylene, polyvinyl chloride, polystyrene, nylon, polyimide, polyvinylidene chloride, polyvinyl alcohol, fluorine containing resin, chlorinated rubber, and ionomer resin; papers such as capacitor paper, and paraffin paper, paper impregnated with a resin, parchment paper, and transparent synthetic paper; opaqued products prepared from these sheets or films, colored films or sheets; metal foils, etc.. The substrate 16 can also comprise a combination or laminate of two or more species selected from the above-mentioned films. The transfer-receiving material can be in the form of a sheet having an A-size or B-size, but may preferably be in the form of a continuous sheet having an arbitrary width.

The adhesive layer 15 to be formed on an image forming surface of the substrate 16 comprise an adhesive which shows a good adhesion property with respect to the substrate 16 and also shows a good adhesion property with respect to an ink which is capable of being well transferred. Specific examples of such an adhesive may include vinyl acetate resins, vinyl chloride-vinyl acetate copolymers, ethylene-vinyl acetate copolymers, styrene-acrylic acid copolymer, nylon and saponification product of these resins, ternary copolymers containing a small amount of a copolymerized monomer such as (meth)acrylic acid, maleic acid, fumaric acid, and itaconic acid; linear polyester resins, acrylic resins, epoxy resins, polyurethane resins, etc.. Among these, it is preferred to use a vinyl chloride-vinyl acetate copolymer, (particularly, a partially saponified product thereof), and/or a linear polyester resins. The adhesive layer 15 may be formed by use of an ordinary coating method such as a solution coating, and emulsion coating, and may preferably have a thickness of about 0.05 to 1 μm.

In an eighth embodiment of the present invention, a transparent resin sheet having a toughened surface on one side thereof is used as a transfer-receiving material B.

More specifically, the transparent resin sheet to be used in the eighth embodiment may be one selected from various transparent resin sheets enumerated in the description of the above fifth embodiment, wherein the image forming surface thereof has been roughened. As the method of toughening such a surface, it is possible to use a method known in the prior art such as embossing and sand blasting. The degree of the toughening may preferably be about 20 to 80 in terms of haze, and may preferably be 300 sec or lower in terms of Bekk smoothness measured by means of an Ohken type smoothness tester.

In the thermal transfer sheet according to the above eighth embodiment, the substrate film, the heat-fusible ink layer and the adhesive layer may be the same as those used in the fifth embodiment as described hereinabove.

Figure 2:
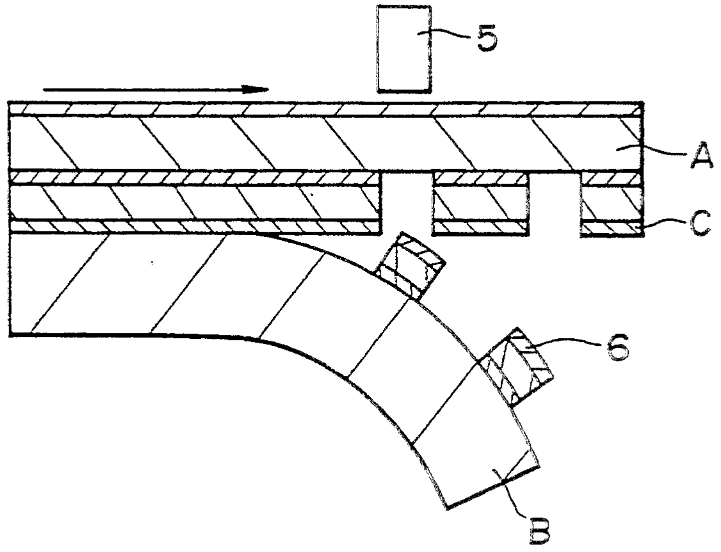
FIG. 2 is a schematic sectional view showing the thermal transfer sheet according to the present invention in a printing state.

In the eighth embodiment, when the thermal transfer sheet according to this embodiment is supplied with heat and then the transfer-receiving material B is separated therefrom as shown in FIG. 2, an image 6 is formed on the transfer-receiving material B.

Figure 5:
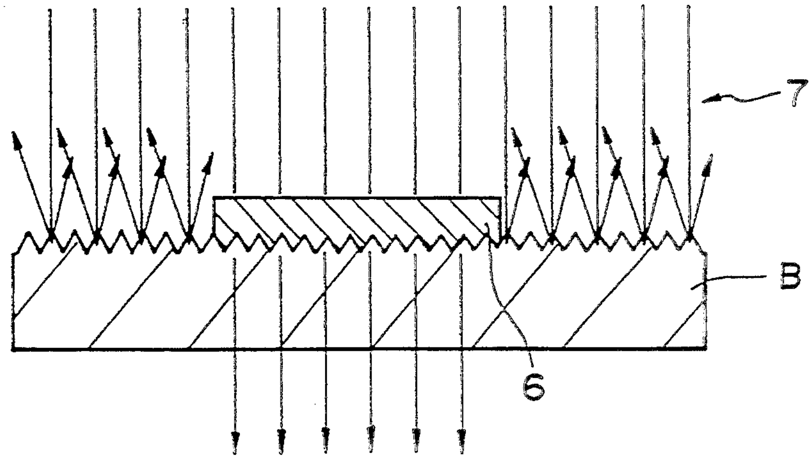
FIG. 5 is a schematic view for illustrating a state of OHP projection.

As schematically shown in FIG. 5, when a light beam 7 is supplied to the thus formed image 6 from a light source of an OHP, a considerable part of the light beam 7 from the light source is irregularly reflected by the toughened surface of the transparent resin sheet B in a region thereof having no ink image, so that a dark background is projected on a screen (not shown). On the other hand, in a region of the transparent resin sheet B having a transferred ink layer 6, the ink layer 6 fills the roughened surface of the resin sheet B so as to smooth the surface, whereby the reflection performance disappears. As a result, the ink layer 6 and the sheet B transmit the light beam 7 supplied from the light source, and therefore a bright image (not shown) is formed on the dark background formed on the basis of the roughened portion. In such a case, when the ink layer is black, a black image which is darker than the background is projected. On the other hand, when the ink layer is colored transparent red, yellow, blue, etc., a clear and bright image having such a color is projected. In addition, the ink layer is colorless and transparent, a bright white image is projected.

In a ninth embodiment of the present invention, a cloth (or fabric) is used as the transfer-receiving material B.

The cloth or fabric to be used as the transfer-receiving material B may be any of conventional woven fabrics (or woven textiles) or non-woven fabrics to be used for curtains, outdoor displays flags, etc., such as cotton fabric, polyester fabric, cotton-polyester mixed fabric, and polypropylene non-woven fabric. However, the cloth or fabric to be used for such a purpose should not be restricted to such specific examples thereof. When such a woven fabric or non-woven fabric has fine meshes, it can be used as such. However, when such a woven fabric or non-woven fabric has relatively coarse meshes, it is preferred to subject the printing surface thereof to a sealing treatment.

The sealing treatment may generally be effected easily, e.g., by use of an extender pigment such as talc, kaolin, silica, activated clay, calcium carbonate, and precipitated barium sulfate; a white pigment such as titanium oxide and zinc oxide; or a mixture thereof. More specifically, for example, such a pigment may be added to an aqueous emulsion such as those containing an acrylic resin, a polyvinyl acetate, a polyvinyl chloride, a vinyl chloride-vinyl acetate copolymer, or an aqueous solution such as those containing a water-soluble cellulose derivative, polyacrylic acid, polyvinyl alcohol, polyvinyl pyrrolidone, starch, casein, and sodium alginate, in an amount of 10 to 50 wt. % to prepare a dispersion, and such a dispersion may be applied onto the above fabric by an ordinary coating method so as to provide a coating amount of 5 to 100 $g/m^2$ based on solid content, and then the resultant coating may be dried.

In the thermal transfer sheet according to the above ninth embodiment, the substrate film, the heat-fusible ink layer and the adhesive layer may be the same as those used in the thermal transfer sheet according to the first embodiment as described hereinabove.

When the above thermal transfer sheet comprising such a fabric as the transfer-receiving material B is used and the printing operation is effected by use of a large size printer as a large size plotter, it is possible to print characters and images on the fabric which are similar to those formed by use of India ink and a brush.

Figure 6:
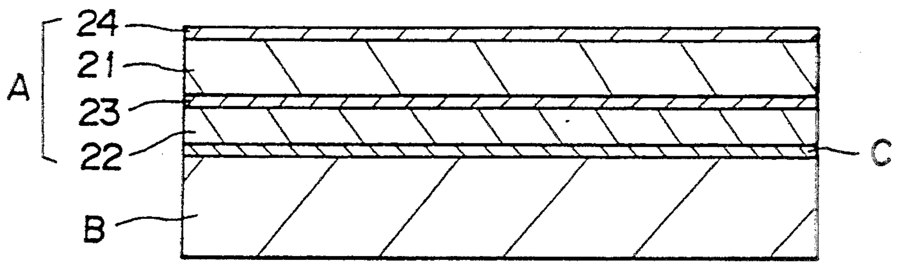
FIG. 6 is a schematic sectional view showing a thermal transfer sheet according to a further embodiment of the present invention.

FIG. 6 is a schematic sectional view showing a thermal transfer sheet according to the tenth embodiment of the present invention.

In the tenth embodiment, as shown in FIG. 6, a co-winding type thermal transfer sheet according to the present invention comprises a thermal trasnfer sheet A and a transfer-receiving material B which is peelably bonded to the thermal transfer sheet A by an adhesive layer C.

As shown in FIG. 6, the above thermal transfer sheet A comprises a substrate film 21 and a heat-fusible ink layer 22 disposed thereon. It is possible to dispose a separation layer 23 between the substrate film 21 and the ink layer 22, and/or to dispos a slip (or slipping) layer 24 on the back surface of the substrate film 21, as desired.

The substrate film 21, the heat-fusible ink layer 22, the separation layer 23 and the slip layer 24 to be used in the tenth embodiment may be the same as the substrate film 1, the heat-fusible ink layer 2, the separation layer 3 and the slip layer 4 used in the first embodiment as described above, and therefore the detailed description thereof is omitted.

In the tenth embodiment, a thermal (or heat sensitive) color developing paper is used as the transfer-receiving material B.

The thermal color developing paper as the transfer-receiving material B to be used for such a purpose may be any of those known in the prior art.

The thermal color-developing paper comprises a paper as a substrate and a color-developing layer disposed on a surface thereof comprising a colorless dye which is capable of developing a color under the action of an acid, and a solid acid as a color-developer (or a color-developing agent). The color-developing layer may comprise separate layers respectively comprising the dye and the color-developer, or may comprise a single layer comprising a mixture of these agents. In addition, in view of an improvement in the stability, it is possible to micro-encapsulate the dye and/or the color-developer with a shell material which is capable of being broken by heat.

Specific examples of the dye may include: Crystal Violet lactone, 3-diethylamino-6-methyl-7-anilinofluorane, 3-diethylamino-6-methyl-7-chlorofluorane, 3-indolino-3-p-dimethylaminophenyl-6-dimethyl aminophthalide, etc.. As a matter of course, the dye to be used in the present invention should not be restricted to the above specific examples thereof.

On the other hand, representative examples of the color-developer may include: phenolic substances such as 4,4'-isopropylidene diphenyl, 4,4'-isopropylidene bis (2-chlorophenol), 4,4'-isopropylidene bis (2-tertiary butylphenol), 4-phenylphenol, and 4-hydroxy diphenoxide. As a matter of course, the color-developer to be used in the present invention should not be restricted to the above specific phenolic substances.

Based on the species of the above dyes and color-developers, or a combination thereof it is possible to form a color developing-layer which is capable of developing a desired color and/or is capable of developing a color at a desired color-developing temperature.

For example, the color-developing layer may be one which does not develop a color at a transfer temperature at which the ink of the above thermal transfer sheet is transferred, and is capable of developing a color at a temperature higher than such a transfer temperature, or may be one which develops a color at a temperature lower than such a transfer temperature. In the former case, it is possible to form an ink image based on the transfer of the above ink layer and a image having a mixed color comprising a hue of the above ink layer and an color based on the color development in the color-developing layer. In the latter case, it is possible to form a development image based on the color development in the color-developing layer and an image having a mixed color comprising a hue of the above ink layer and an color based on the color development in the color-developing layer. Further, it is also possible to form a transparent protection layer on the surface of the above color developing layer of the thermal color-developing paper. The thermal color-developing paper may be in the form of a sheet of A-size or B-size, but may preferably be in the form of a continuous sheet having an arbitrary width.

The tenth embodiment of the present invention is mainly characterized by the structure of the adhesive layer C for temporarily bonding the above thermal transfer sheet A and the thermal color-developing paper B to each other.

The adhesive layer temporarily bonding the above-mentioned thermal transfer sheet A to the thermal color-developing paper B comprises adhesive particles having a low glass-transition temperature, and wax particles and resin particles having a high glass-transition temperature. The adhesive layer may preferably have an adhesive strength (or adhesive force) of 300 to 1500 g. Such an adhesive strength may be measured by cutting sample having a width of 25 mm and a length of 55 mm, and subjecting the sample to measurement by means of a sliding friction meter (HEIDON-14, mfd. by Shinto Kagaku K. K.) at a pulling speed of 1800 mm/min.

If the adhesive strength is below the above range, the adhesive strength between the thermal transfer sheet and the thermal color-developing paper is insufficient, both of these are liable to be peeled from each other, and the thermal transfer sheet is liable to be wrinkled. If the adhesive strength is above the above range, the adhesive strength is sufficient but the ink layer is liable to be transferred to the thermal color-developing paper even in the non-printing region so as to contaminate the thermal color-developing paper. The adhesive strength may particularly preferably be in the range of 400 to 800 g.

However, in a case where the thermoplastic resin content in the ink layer is 9 wt. % or higher in terms of solid content in the ink layer, e.g., in the case of an ethylene-vinyl acetate copolymer having a vinyl acetate content of 28%, the adhesion between the ink layer and the substrate film is enhanced corresponding to such a content. Accordingly, even when the adhesive strength of the adhesive layer to the thermal color-developing paper is 800 to 1500 g, there may be obtained a thermal transfer sheet capable of preventing the contamination of the thermal color-developing paper.

Figure 8:
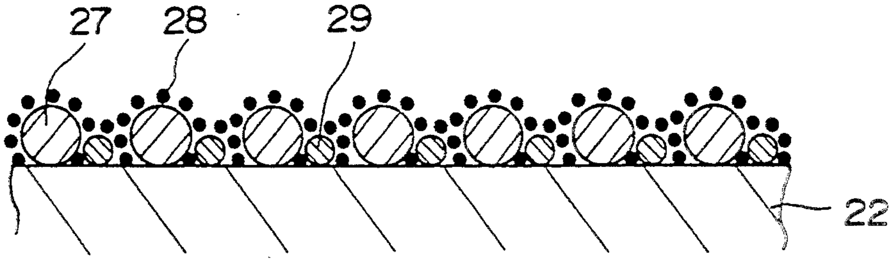
FIG. 8 is a schematic view for illustrating the structure of an adhesive layer of the thermal transfer sheet shown in FIG. 6.

The above-mentioned adhesive may preferably have a glass-transition temperature in the range of $-90°$ to $-60°$ C. Specific examples of such an adhesive may include a rubber-type adhesive, an acrylic-type adhesive, and a silicone-type adhesive. In view of morphology, adhesives may include a solvent solution-type, an aqueous solution-type, a hot melt-type, and an aqueous or oily emulsion-type. Each of these types may be used in the present invention, but an adhesive particularly preferably used in the present invention is an acrylic aqueous emulsion-type adhesive. In such a case, the adhesive may preferably have a particle size of about 1 to 30 $\mu$m, more preferably 3 to 20 $\mu$m. When such an emulsion-type adhesive is used, the adhesive 7 constituting the adhesive layer retains particulate form, as shown in FIG. 8.

When the above-mentioned adhesive is used alone, excellent adhesion may be provided, but the peelability of the thermal color-developing paper is insufficient and uneven (or non uniform). As a result, when an unexpected force is applied to the thermal transfer sheet prior to the thermal transfer operation, e.g., at the time of production, storage, or transportation thereof, the ink layer of the thermal transfer sheet is transferred to the thermal color-developing paper to cause ground staining. Further, the cutting of the ink layer is deteriorated at the time of thermal transfer operation, and the ink laeyr is transferred to the periphery of a region which has been provided with heat by means of a thermal-head, whereby the resolution of the transferred image is deteriorated.

In the present invention, however, when an emulsion containing fine resin particles, e.g., resin particles 28 having a particle size of about 0.01 to 0.5 μm, is added to the above-mentioned emulsion adhesive, the adhesion may be regulated to a preferred range thereof, whereby the above-mentioned problem of ground staining is solved. Further, it has been found that when an emulsion 29 of a wax which is similar to that used in the formation of the ink layer is added to the emulsion adhesive, the cutting of the temporary adhesive layer C is improved, so that the resolution of the transferred image is remarkably improved.

The above-mentioned resin emulsion may preferably comprise a thermoplastic resin such as ethylene-vinyl acetate copolymer, ethylene-acrylic acid ester copolymer, polyethylene, polystyrene, polypropylene, polybutene, vinyl chloride resin, vinyl chloride-vinyl acetate copolymer, and acrylic resin. Among these, an acrylic emulsion is particularly preferred. Such resin particles may preferably have a glass transition temperature higher than that of the above-mentioned adhesive (e.g., 60° C. or higher), and can also be heat cured resin particles in some cases.

The wax emulsion may be obtained by emulsifying the above-mentioned wax by a known method, and the particles size may preferably be as small as possible. However, the wax emulsion usable in the present invention is not particularly restricted to such an emulsion.

The weight ratio among the above adhesive agent, resin particle, and wax may preferably be (1 to 3):(0 to 2):(1 to 3). When the weight ratio is outside such a range, various problem as described above may undesirably be posed. In a cose where the adhesive layer C comprises a mixture (such as SK Dyne RE-4, mfd. by Soken Kagaku K. K.) of, e.g., an acrylic emulsion type adhesive and a wax, a portion of the surface thereof may be bonded to a transfer-receiving material. Accordingly, in case where the transfer-receiving material comprises an OHP sheet, the surface thereof may undesirably have a white color. However, since the above adhesive RE-4 has a good storage stability, it is preferred to use a two component type when the transfer receiving material comprises a sheet other than the OHP sheet. In a case where the adhesive layer C comprises an adhesive (such as SK Dyna T-700, mfd. by Soken Kagaku K. K.) comprising resin particles having an adhesive property, the adhesive T-700 has a lower storage stability than that of the above adhesive RE-4, but they are bonded to a transfer-receiving material in the form of dots. As a result, in such a case, even when the OHP sheet to used as the transfer-receiving material the surface thereof does not have a white color.

The adhesive layer C comprising the above-mentioned components can be disposed on the surface of the thermal color developing paper B, but a certain adhesiveness remains on the resultant printed matter. Accordingly, the adhesive layer may preferably be disposed on the surface of the ink layer 22 of the thermal transfer sheet. In such a case, since the adhesive is used in the form of an aqueous emulsion, the ink layer is not substantially impaired. The coating method or drying method for the emulsion is not particularly be restricted. However, it is preferred to effect the drying at a low temperature so as to retain particulate form of the emulsion.

The adhesive layer may preferably have a thickness of 0.1 to 20 μm, i.e., 0.1 to 5 $g/m^2$ in terms of coating amount of solid content.

The thermal transfer sheet A and the thermal color-developing paper B may preferably be bonded to each other by continuously bonding the thermal color developing paper to the surface of the thermal transfer sheet while forming an adhesive layer on the surface of the ink layer of the thermal transfer sheet and winding the resultant laminate into a roll form. When such a laminate is wound into a roll, it is possible to dispose the thermal color-developing paper outside or to dispose the thermal transfer sheet outside. In addition, it is also possible to cut such a lamiante into a sheet form.

Figure 7:
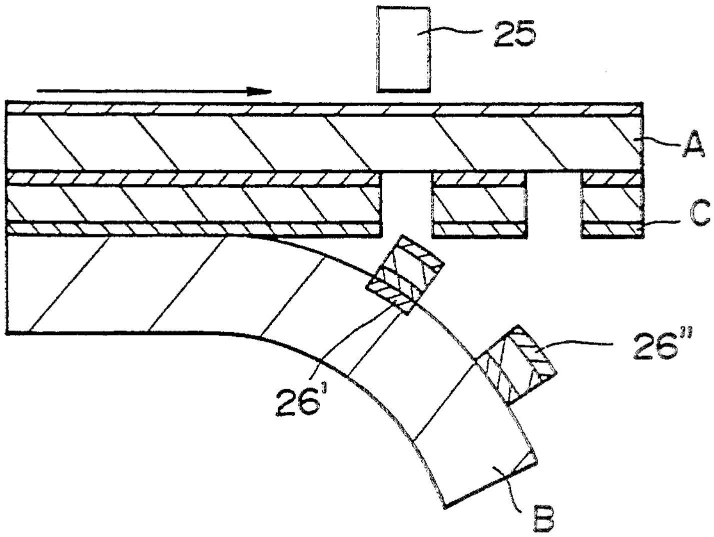
FIG. 7 is a schematic sectional view showing the thermal transfer sheet according to the present invention in a printing state.

When the thermal transfer sheet according to the tenth embodiment as described above is loaded in, e.g., a facsimile printer, and conveyed as shown by an arrow in FIG. 7, printing operation is effected while changing the quantity of heat supplied from a thermal-head 25, and thereafter the thermal color-developing paper B is separated, desired images having two or more colors, i.e., color development images 26' and 26" are formed on the thermal color-developing paper B.

In each of the respective embodiments as described above, it is possible to use a thermoplastic resin binder as a binder constituting the heat-fusible ink layer. When the binder of the heat-fusible ink layer predominantly comprises a thermoplastic resin binder in the above manner, it is possible to form an OHP image or a tracing paper image excellent in heat resistance and wear resistance.

Specific examples of the thermoplastic resin binder to be used for such a purpose may include polyester type resins, polyacrylic acid ester type resins, polyvinyl acetate type resins, vinyl chloride-vinyl acetate copolymers, ethylene-vinyl acetate copolymers, styrene acrylate type resins, polyurethane type resins, etc.. Among these, it is particularly preferably to use a (meth)acrylic acid ester resin such as methyl methacrylate, butyl methacrylate, hydroethyl methacrylate, etc.. In view of heat resistance, wear resistance, transferability, etc., it is preferred to use a mixture or a copolymer of a methyl methacrylate resin having a relatively high Tg, and a butyl methacrylate resin having a relatively low Tg. when such a mixture or a copolymer is used, the mixing ratio by weight may preferably be (former)/(latter)=about 2/8 to 8/2. The binder may singly comprise the above thermoplastic resin, but it is also possible to add an ordinary wax to such a binder to be used in an amount of 10 wt. % or below based on the total amount of the binder.

In order to form the heat-fusible ink layer on the substrate film, by use of the heat-fusible ink comprising such a binder, it is possible to use a method wherein desired components such as a pigment and a binder predominantly comprising a thermoplastic resin are melt-kneaded and the resultant kneaded mixture is applied onto a substrate by a hot-melt coating method, etc., or to use a method using an emulsion ink comprising a mixture of an emulsion obtained by emulsifying or dispersing the binder predominantly comprising the above thermoplastic resin in an aqueous medium capable of containing an alcohol, etc.; and an aqueous dispersion containing a pigment. More specifically, iris possible to use a method wherein such an emulsion ink is applied to the substrate film and the resultant coating is dried. In general, the thus formed ink layer may preferably have a thickness of about 0.5 to 20 μm.

In the above respective embodiments of the co-winding type thermal transfer sheet according to the present invention, the basic structures thereof have been described. As a matter of course, any of techniques known in the field of a thermal transfer sheet is also applicable to the thermal transfer sheet according to the present invention. More specifically, such a technique may include: one wherein a slip layer 4, 14 or 24 for preventing the sticking to a thermal-head and improving slip property is disposed on a back side surface of the thermal transfer sheet as shown in FIGS. 1, 3 and 6; one wherein a wax layer or mat layer 3, 13 or 23 which constitutes a surface layer after the transfer operation is disposed between the substrate film and the ink layer so that the resultant printed image may be matted; one wherein the ink layer is caused to have a hue other than black; etc..

For example, it is possible to cause the colorant to be used in the heat-fusible ink layer to have a hue other than black and the three primary colors of yellow, magenta, and cyan.

Such a colorant having a neutral tint may be one having a hue other than black, yellow, magenta and cyan and may be one having an arbitrary hue obtained by mixing at least two species of the above three primary colors, or may singly be one having an inherent hue other than the above three primary colors. For example, representative examples of such a color may include red, green, purple (or violet), pink, etc.. It is possible to use a hue intermediate between these hues. In addition, in the present invention, it is also possible to use a fluorescent color such as those based on a so-called fluorescent pigment or fluorescent dye; a metallic luster colorant such as gold colorant and silver colorant; and another colorant such as white colorant. These colorants having a color other than the three primary colors may be prepared by mixing (or formulating) known colorants by a user, or may also be those which are easily available from the market. In general, it is preferred to use such a colorant in an amount of about 5 to 70 wt. % in the ink layer.

Further, the transfer-receiving material may also be one having a printed letter, character or image on the printing surface thereof (i.e., a surface which is to be subjected to an printing operation) or the surface thereof reverse to the printing surface. In such a case, the printed letter, character or image may arbitrarily be selected from those which are generally printed in the art, as long as it does not extremely lower the readablness (or discernibleness) of the letters, character, or image to be formed by use of a thermal transfer material according to the present invention. Specific examples of such a printing image may include: various patterns or designs such as ground (or background) pattern, fine and thin numberless letters and symbols (which may also functions as a kind of the ground pattern), wood grain, and floral pattern or design; and other patterns or designs such as name of company, or corporation, advertising, symbolic mark, trade name, address, and name of division or section in change of a certain matter.

Hereinbelow, the present invention will be described in more detail with reference to Experiment Examples and Comparative Examples. In the description appearing hereinafter, "parts" and "%" are those by weight, unless otherwise noted specifically.

Experiment Example A (Experiment Example A-1)

A 4.5 μm thick polyethylene terephthalate film of which back surface had been supplied with a slip layer, was used as a substrate No. 1. On the surface of the substrate No. 1, the following ink composition No. 1 was applied in a coating amount of 4 g/m$^2$ (solid content), and the resultant coating was dried at 60° to 70° C. to form an ink layer.

| Ink Composition No. 1 | |
|---|---|
| Carnauba wax emulsion (solid content = 40%, particle size = 0.3 to 0.4 μm) | 50 parts |
| Ethylene/vinyl acetate copolymer emulsiom (solid content = 40%) | 30 parts |
| Carbon black aqueous dispersion (solid content = 40%) | 20 parts |

Further, a temporary adhesive No. 1 having the following composition was applied onto the above ink layer by a gravure coating method in a coating amount of 0.5 g/m$^2$ (after drying), and thereafter a tracing paper having a basis weight of 50 g/m$^2$ was bonded to the resultant product at a nip temperature of 50° C. and a nip pressure of 5 Kg/cm$^2$, whereby a co-winding type thermal transfer sheet according to the present invention was obtained.

| Temporary adhesive No. 1 | |
|---|---|
| Acrylic type adhesive resin dispersion (solid content = 40%, glass transition temperature −58° C.) | 10 parts |
| Carnauba wax aqueous dispersion (solid content = 40%, melting point = 83° C.) | 15 parts |
| Water | 10 parts |
| Isopropanol | 20 parts |

(Experiment Example A-2)

A substrate film which was the same as the substrate No. 1 used in Experiment Example A-1 was used. On one surface side of the substrate film, an aqueous isopropyl alcohol emulsion of carnauba wax (40%) was applied in a coating amount of 0.7 g/m$^2$ (based on solid content), and the resultant coating was dried at 50° to 60° C. to form a wax layer, whereby a substrate No. 2 was prepared. On the surface of the substrate No. 2, the following ink composition No. 2 was applied in a coating amount of 2.0 g/m$^2$ (solid content) and the resultant coating was dried at 60° to 70° C. to form an ink layer.

| Ink Composition No. 2 | |
|---|---|
| Carnauba wax emulsion (solid content = 40%) | 70 parts |
| Ethylene/vinyl acetate copolymer emulsiom (solid content = 40%) | 10 parts |
| Carbon black aqueous dispersion (solid content = 40%) | 20 parts |

Further, a temporary adhesive layer was formed on the above ink layer in the same manner as in Experiment Example A-1 and thereafter a tracing paper was bonded to the resultant product in the same manner as in Experiment Example A-1, whereby a co-winding type thermal transfer sheet according to-the present invention was obtained.

(Experiment Example A-3)

A 4.5 μm thick polyethylene terephthalate film of which back surface had been supplied with a slip layer, was used as a substrate film. On one surface side of the substrate film, an aqueous isopropyl alcohol emulsion of carnauba wax (40%) was applied in a coating amount of 0.5 g/m$^2$ (based on solid content), and the resultant coating was dried at 50° to 60° C. to form a wax layer, whereby a substrate No. 3 was prepared. On the surface of the substrate No. 3, the following ink composition No. 3 was applied in a coating amount of 2 g/m$^2$ (solid content), and the resultant coating was dried at 60° to 70° C. to form an ink layer.

| Ink Composition No. 3 | |
|---|---|
| Carnauba wax emulsion (solid content = 40%) | 20 parts |
| Paraffin wax emulsion (solid content = 40%) | 50 parts |
| Ethylene/vinyl acetate copolymer emulsion (solid content = 40%) | 10 parts |
| Carbon black aqueous dispersion (solid content = 40%) | 20 parts |

Further, a temporary adhesive layer was formed on the above ink layer in the same manner as in Experiment Example A-1 and thereafter a tracing paper was bonded to the resultant product in the same manner as in Experiment Example A-1, whereby a co-winding type thermal transfer sheet according to the present invention was obtained.

(Experiment Example A-4)

A 4.5 μm-thick polyethylene terephthalate film of which back surface had been provided with a slip layer was used as a substrate film. Onto one surface side of such a substrate film, an ink composition No. 4 having the following composition was applied so as to provide a coating amount of 2 g/m$^2$ (solid content), and then the resultant coating was dried at 60° to 70° C., thereby to form an ink layer.

| Ink Composition No. 4 | |
|---|---|
| Carnauba wax emulsion (solid content = 40%) | 20 parts |
| Acrylic resin emulsion (solid content = 40%) | 20 parts |
| Carbon black aqueous dispersion (solid content = 40 &) | 20 parts |
| IPA | 60 parts |
| Water | 20 parts |

Further, a temporary adhesive layer was formed on the above ink layer in the same manner as in Experiment Example A-1, and thereafter, a tracing paper was bonded thereto in the same manner as in Experiment Example A-1, whereby a co-winding type thermal transfer sheet according to the present invention was obtained.

(Comparative Example A-1)

A thermal transfer sheet of Comparative Example was prepared in the same manner as in Experiment Example A-1 except that the following ink composition was used to form an ink layer instead of that used in Experiment Example A-1, and the ink layer was formed by use of a hot melt process. The following ink composition was prepared by melt kneading the respective components at 120° C. for 4 hours by means of an attritor.

| Ink Composition | |
|---|---|
| Carnauba wax | 50 parts |
| Ethylene/vinyl acetate copolymer | 30 parts |
| Carbon black | 20 parts |

By use of each of the thermal transfer sheets of Experiment Examples A-1 to A-4 and Comparative Example A-1 prepared above, an image was formed by means of a large size plotter. The thus formed images were heated up to 80° to 100° C. for 2 min., to evaluate the heat resistance thereof. The results are shown in the following Table 1.

TABLE 1

| | Heat resistance | | |
|---|---|---|---|
| Thermal transfer sheet | 80° C. | 90° C. | 100° C. |
| Experiment Example A-1 | ○ | ○ | ○ |
| Experiment Example A-2 | ○ | ○ | ○ |
| Experiment Example A-3 | ○ | ○ | ○ |
| Experiment Example A-4 | ○ | ○ | ○ |
| Comparative Example A-1 | Δ | X | X |

○: No blurring was observed.
Δ: Blurring was somewhat observed.
X: Blurring was considerably observed.

Experiment Example B (Experiment Example B-1)

A 4.5 μm thick polyethylene terephthalate film of which back surface had been supplied with a slip layer, was used as a substrate film. On the surface of the substrate film, the following ink composition No. 5 was applied in a coating amount of 4.0 g/m$^2$ (solid content) to form an ink layer.

| Ink composition No. 5 | |
|---|---|
| Carnauba wax | 15 parts |
| Ethylene/vinyl acetate copolymer | 10 parts |
| Carbon black | 20 parts |
| Polyethylene wax | 55 parts |
| Petroleum resin | 10 parts |

Further, a temporary adhesive No. 1 used in Experiment Example A was applied onto the above ink layer by a gravure coating method in a coating amount of 0.5 g/m$^2$ (after drying), and thereafter a tracing paper (VELLUM TB, light transmittance in the wavelength range of 500 to 600 nm: 40 to 50%) was bonded to the resultant product at a nip temperature of 50° C. and a nip pressure of 5 Kg/cm$^2$, whereby a co-winding type thermal transfer sheet according to the present invention was obtained.

(Experiment Example B-2)

A substrate film which was the same as the substrate No. 1 used in Experiment Example A-1 as used. On one surface side of the substrate film, following ink composition No. 6 was applied in a coating amount of 2.0 g/m$^2$ (solid content) to form an ink layer.

| Ink composition No. 6 | |
|---|---|
| Carnauba wax | 15 parts |
| Ethylene/vinyl acetate copolymer | 5 parts |
| Carbon black | 20 parts |
| Polyethylene wax | 55 parts |
| Petroleum resin | 10 parts |

Further, a temporary adhesive No. 1 used in Experiment Example A-1 was applied onto the above ink layer by a gravure coating method in a coating amount of 0.5 g/m$^2$ (after drying), and thereafter a tracing paper (Ohji OB Trace, light transmittance in the wavelength range of 500 to 600 nm: 50 to 60%) was bonded to the resultant product at a nip temperature of 50° C. and a nip pressure of 5 Kg/cm$^2$, whereby a co-winding type thermal transfer sheet according to the present invention.

(Experiment Example B-3)

A 6.0 $\mu$m thick polyethylene terephthalate film of which back surface had been supplied with a slip layer, was used as a substrate film. On the surface of the substrate film, the following ink composition No. 7 was applied in a coating amount of 2.0 g/m$^2$ (solid content) to form an ink layer.

| Ink composition No. 7 | |
|---|---|
| Carnauba wax | 15 parts |
| Ethylene/vinyl acetate copolymer | 10 parts |
| Carbon black | 25 parts |
| Polyethylene wax | 55 parts |
| Petroleum resin | 10 parts |

Further, a temporary adhesive used in Experiment Example B-1 was applied onto the above ink layer by a gravure coating method in a coating amount of 0.5 g/m$^2$ (after drying), and thereafter a tracing paper (SK Trace HC, light transmittance in the wavelength range of 500 to 600 nm: 60 to 65%) was bonded to the resultant product at a nip tempertaure of 50° C. and a nip pressure of 5 Kg/cm$^2$, whereby a co-winding type thermal transfer sheet according to the present invention.

(Experiment Example B-4)

A co-winding type thermal transfer sheet according to the present invention was prepared in the same manner as in Experiment Example B-1 except that Yupo (TPG 90, light transmittance in the wavelength range of 500 to 600 nm: 45 to 55%) was used as the tracing paper instead of that used in Experiment Example B-1.

(Comparative Example B-1)

A thermal transfer sheet of Comparative Example was prepared in the same manner as in Experiment Example B-1 except that Mitsubishi Tracing Paper (light transmittance in the wavelength range of 500 to 600 nm: 70 to 80%) was used as the tracing paper instead of that used in Experiment Example B-1.

By use of each of the thermal transfer sheets of Experiment Examples B-1 to B-4 and Comparative Example B-1 prepared above, an image was formed by means of a large size plotter. The thus formed images were copied by means of a diazo-type copying machine under the same conditions so as to provide a blueprint images, thereby to evaluate the contrast thereof. The results are shown in the following Table 2.

TABLE 2

| Thermal transfer sheet | Evaluation of contrast |
|---|---|
| Experiment Example B-1 | Contrast was high |
| Experiment Example B-2 | Contrast was high |
| Experiment Example B-3 | Contrast was high |
| Experiment Example B-4 | Contrast was high |
| Comparative Example | Contrast was poor |

Experiment Example C (Experiment Example C-1)

A 4.5 $\mu$m-thick polyethylene terephthalate film of which back surface had been provided with a slip layer was used as a substrate film. Onto one surface side of such substrate film, for the purpose of providing a matte effect after the printing operation a matting agent having the following composition was applied so as to provide a coating amount of 0.5 g/m$^2$ and then the resultant coating was dried at 80° to 90° C. thereby to form a mat layer.

Further, onto the resultant mat layer, an ink composition having the following composition was applied by a hot-melt coating method so as to provide a coating amount of 4 g/m$^2$ (solied content), and then the resultant coating was dried at 80° to 90° C., thereby to form an ink layer.

| | |
|---|---|
| Matting agent | |
| Carbon black | 24 parts |
| Polyester wax | 16 parts |
| Dispersing agent | 1.5 parts |
| MEK | 30 parts |
| TOL | 30 parts |
| Curing agent | 3 parts |
| Ink composition | |
| Carbon black | 19 parts |
| Calcium carbonate | 10 parts |
| Polyethylene wax (Molecular weight = 700) | 50 parts |
| Microcrystalline wax | 25 parts |
| Carnauba wax | 4.5 parts |
| Ethylene/vinyl acetate coplymer | 8.5 parts |

Further, onto the above ink layer, the temporary adhesive No. 1 used in Experiment Example A was applied by a gravure-coating method so as to provide a coating amount of 0.5 g/m$^2$ (after drying), and the resultant coated product and a tracing paper (basis weight=50 g/m$^2$) were bonded to each other at a nip temperature of 50° C. under a nip pressure of 5 kg/m$^2$ whereby a co-winding type thermal transfer sheet according to the present invention was obtained.

(Experiment Example C-2)

A co-winding type thermal transfer sheet according to the present invention was prepared in the same manner as in Experiment Example C-1 except that an ink composition having the following composition was used instead of the ink composition used in Experiment Example C-1.

| Ink Composition | |
|---|---|
| Carbon black | 19 parts |
| Micro silica | 6 parts |
| Polyethylene wax (Molecular weight = 700) | 50 parts |
| Microcrystalline wax | 25 parts |
| Carnauba wax | 4.5 parts |
| Ethylene/vinyl acetate coplymer | 8.5 parts |

(Experiment Example C-3)

A 4.5 μm-thick polyethylene terephthalate film of which back surface had been provided with a slip layer was used as a substrate film. Onto one surface side of such a substrate film, for the purpose of providing a matte effect after the printing operation, a matting agent having the following composition was applied so as to provide a coating amount of 0.4 g/m² and then the resultant coating was dried at 80° to 90° C. thereby to form a mat layer.

Further, onto the resultant mat layer, an ink composition haivng the following composition was applied by a hot meet coating method so as to provide a coating amount of 3.0 g/m² (solid content), and then the resultant coating was dried at 80° to 90° C., thereby to form an ink layer.

| | |
|---|---|
| Matting agent | |
| Carbon black | 24 parts |
| Polyester type resin | 16 parts |
| Dispersing agent | 2 parts |
| MEK | 30 parts |
| Toluene | 30 parts |
| Ink composition No. 8 | |
| Carbon black | 19 parts |
| Calcium carbonate | 10 parts |
| Polyethylene wax | 50 parts |
| Microcrystalline wax | 25 parts |
| Carnauba wax | 5 parts |
| Ethylene/vinyl acetate coplymer | 9 parts |

Further, onto the above ink layer, the temporary adhesive No. 1 used in Experiment Example A was applied by a gravure-coating method so as to provide a coating amount of 0.4 g/m² (after drying), and the resultant coated product and a tracing paper (trade name: Yupo TPG-90, mfd. by Oji Yuka, smoothness=100 sec) were bonded to each other at a nip temperature of 50° C. under a nip pressure of 5 kg/m² whereby a co-winding type thermal transfer sheet according to the present invention was obtained. The smoothness used herein was one obtained by measuring the image receiving surface of the tracing paper by means of a Bekk smoothness meter (mfd. by Toyo Seiki Seisakusho). The thus obtained results were shown by using seconds.

(Experiment Example C-4)

A co-winding type thermal transfer sheet according to the present invention was prepared in the same manner as in Experiment Example C-3 except that an ink composition having the following composition was used instead of the ink composition used in Experiment Example C-3.

| Ink Composition | |
|---|---|
| Carbon black | 19 parts |
| Micro silica | 6 parts |
| Polyethylene wax | 50 parts |
| Microcrystalline wax | 25 parts |
| Carnauba wax | 5 parts |
| Ethylene/vinyl acetate coplymer | 9 parts |

(Comparative Example C-1)

A thermal transfer sheet of Comparative Example was prepared in the same manner as in Experiment Example C-3 except that heat-resistant particles (calcium carbonate) were not added to the ink layer used in Experiment Example c-3.

By use of each of the thermal transfer sheets of Experiment Examples C-1 to C-4 and Comparative Example C-1 prepared above, image were formed by means of a large size plotter. Each of the resultent images was sandwiched between two glass plate which hed been left standing in an oven heated up to 100° C. The state of the thus treated image was evaluated at the time of 1 min. and 5 min., respectively, counted from the time of the above sandwiching. The thus obtained results are shown in the following table 3.

TABLE 3

| | Heat resistance 100° C. 1 min. | | |
|---|---|---|---|
| Thermal transfer sheet | Blurring | Glass transfer | Blue print property |
| Experiment Example C-1 | ○ | ○ | ○ |
| Experiment Example C-2 | Δ | Δ | Δ |
| Experiment Example C-3 | ○ | ○ | ○ |
| Experiment Example C-4 | ○ | ○ | ○ |
| Comparative Example C-1 | Δ | Δ | Δ |

| | Heat resistance 100° C. 5 min. | | |
|---|---|---|---|
| Thermal transfer sheet | Blurring | Glass transfer | Blue print property |
| Experiment Example C-1 | ○ | ○ | ○ |
| Experiment Example C-2 | Δ | Δ | Δ |
| Experiment Example C-3 | ○ | ○ | ○ |
| Experiment Example C-4 | ○ | ○ | ○ |
| Comparative Example C-1 | X | X | X |

Blurring
○: No blurring was observed.
Δ: Blurring was somewhat observed.
X: Considerable blurring was observed.
Glass transfer
○: No ink was transferred to the glass at all.
Δ: The ink was somewhat transferred to the glass.
X: The ink was considerably transferred to the glass.
Blue print property
○: Clean images were obtained.
Δ: Somewhat poor images were obtained.
X: Considerably poor images were obtained.

Experiment Example D (Experiment Example D-1)

A 4.5 μm-thick polyethylene terephthalate film of which back surface had been provided with a-slip layer was used as a substrate film. Onto the surface side of such a substrate film, the matting agent used in Experiment Example C-1 was applied so as to provide a coating amount of 0.4 g/m² (solid content) and then the ink composition No. 8 used in Experiment Example C was applied onto the resultant coating layer so as to provide a coating amount of 4.0 g/m² (solid content) thereby to form an ink layer.

Then, a temporary adhesive having the following composition was applied onto the above ink layer by a gravure coating method so as to provide a coating amount of 0.5 g/m² (after drying), and the resultant coated product and a tracing paper (trade name: Yupo TPG-90, mfd. by Oji Yuka, smoothness=100 sec.) were bonded to each other at a nip temperature of 50° C. under a nip pressure of 5 kg/m², whereby a co-winding type thermal transfer sheet according to the present invention was obtained.

| Temporary adhesive | |
|---|---|
| Acrylic type adhesive resin dispersion (solid content = 40%, glass transition temp. = −58° C.) | 10 parts |
| Carnauba wax aqueous dispersion (solid content = 40%, melting point = 83° C.) | 20 parts |
| Water | 30 parts |

-continued

| Temporary adhesive | |
|---|---|
| Isopropanol | 60 parts |

(Experiment Example D-2)

A co-winding type thermal transfer sheet according to the present invention was prepared in the same manner as in Experiment Example D-1 except that an ink composition having the following composition was used instead of the ink composition used in Experiment Example C-1, and a tracing paper (DC Trace, mfd. by Sanyo Kokusaku Pulp, smoothness=(130 sec.) was used instead of the tracing paper (Yupo) used in Experiment Example D-1.

| Ink Composition | |
|---|---|
| Carbon black | 19 parts |
| Micro silica | 4 parts |
| Polyethylene wax | 50 parts |
| Microcrystalline wax | 25 parts |
| Carnauba wax | 5 parts |
| Ethylene/vinyl acetate copolyme | 9 parts |

(Experiment Example D-3)

A 6.0 μm-thick polyethylene terephthalate film of which back surface had been provided with a slip layer was used as a substrate film. Onto the surface side of such a substrate film, a mat layer was formed in the same manner as in Experiment Example D-1, and an ink composition having the following composition was applied onto the resultant mat layer so as to provide a coating amount of 4.0 g/m$^2$ (solid content), thereby to form an ink layer.

| Ink Composition | |
|---|---|
| Carbon black | 12 parts |
| Neo Polyme | 10 parts |
| Paraffin wax | 70 parts |
| Carnauba wax | 14 parts |
| Ethylene/vinyl acetate copolyme | 13 parts |

Further, onto the above ink layer, the temporary adhesive used in Experiment Example D-1 was applied by a gravure coating method so as to provide a coating amount of 0.5 g/m$^2$ (after drying), and the resultant coated product and a tracing paper (trade name: OA Trace, mfd. by Oji Seishi, smoothness=550 sec.) were bonded to each other at a nip temparature of 50° C. under a nip pressure of 5 kg/m$^2$, whereby a co-winding type thermal transfer sheet according to the present invention was obtained.

(Experiment Example D-4)

A 6.0 μm-thick polyethylene terephthalate film of which back surface had been provided with a slip layer was used as a substrate film. Onto the surface side of such a substrate film, a mat layer was formed in the same manner as in Experiment Example D-1, and an ink composition having the following composition was applied onto the resultant mat layer so as to provide a coating amount of 5.0 g/m$^2$ (solid content), thereby to form an ink layer.

| Ink Composition | |
|---|---|
| Carbon black | 12 parts |
| Microcrystalline wax | 28 parts |
| Paraffin wax | 44 parts |
| Carnauba wax | 12 parts |
| Ethylene/vinyl acetate copolyme | 15 parts |

Further, onto the above ink layer, the temporary adhesive used in Experiment Example D-1 was applied by a gravure coating method so as to provide a coating amount of 0.5 g/m$^2$ (after drying) and the resultant coated product and synthetic paper (trade name: Yupo FPG-80, mfd. by Oji Yuka, smoothness=1900 sec.) were bonded to each other at a nip temperature of 50° C. under a nip pressure of 5 kg/m$^2$, whereby a thermal transfer sheet according to the present invention was obtained.

(Comparative Example D-1)

A thermal transfer sheet of Comparative Example was prepared in the same manner as in Experiment Example D-1 except that a tracing paper (Mitsubishi Tracing Paper, smoothness=38 sec.) was used instead of the Tracing paper used in Experiment Example D-1.

By use of each of the thermal transfer sheets of Experiment Example and Comparative Example prepared above, image were formed by means of a large size plotter. In the resultant image, the transferability of the ink (cutting in thin line) was evaluated. Then, each of the resultant images was copied by means of a diazo type copying machine under the same conditions to obtain blue print images. The contrast in the resultant blue print images was evaluated. The thus obtained results are shown in the following Table 4.

TABLE 4

| Thermal transfer sheet | Ink Tranfer ability | Contrast |
|---|---|---|
| Experiment Example D-1 | The image was not peeled. | Contrast was high. |
| Experiment Example D-2 | The image was not peeled. | Contrast was high. |
| Experiment Example D-3 | The image was not peeled. | Contrast was high. |
| Experiment Example D-4 | The image was not peeled. | Contrast was high. |
| Comparative Example D-1 | The image was partially peeled. | Contrast was poor. |

Experiment Example E (Experiment Example E 1)

A 4.5 μm-thick polyethylene terephthalate film of which back surface had been provided with a slip layer, was used as a substrate film. Onto the surface of the substrate film, the ink composition No. 5 used in Experiment Example B-1 was applied in a coating amount of 4.0 g/m$^2$ (solid content) to form an ink layer, whereby a thermal transfer sheet was prepared.

Further, an adhesive having the following composition was applied onto a 100 μm thick polyester sheet by a gravure coating method in a coating amount of 0.5 g/m$^2$ (after drying), and then the resultant coating was dried. The resultant polyester sheet was bonded to the ink layer of the above thermal transfer sheet at a nip temperature of 50° C. and a nip pressure of 5 Kg/cm$^2$, whereby a co-winding type thermal transfer sheet according to the present invention was obtained.

| Adhesive Composition | |
|---|---|
| Acrylic type adhesive resin (glass transition temperature = −58° C.) | 10 parts |
| Polyisocyanate | 1 part |
| Toluene | 44 parts |
| Methyl ethyl ketone | 44 parts |

(Experiment Example E-2)

A substrate film which was the same as that used in Experiment Example E-1, was used. On the surface of the substrate film, the ink composition No. 6 used in Experiment Example B-2 was applied in a coating amount of 2 $g/m^2$ (solid content) to form an ink layer, whereby a thermal transfer sheet was prepared.

Further, an adhesive having the following composition was applied onto a 120 μm thick polypropylene sheet by a gravure coating method in a coating amount of 0.5 $g/m^2$ (after drying), and then the resultant coating was dried. The resultant polypropylene sheet was bonded to the ink layer of the above thermal transfer sheet at a nip temperature of 50° C. and a nip pressure of 5 $Kg/cm^2$, whereby a co-winding type thermal transfer sheet according to the present invention was obtained.

| Adhesive Composition | |
|---|---|
| Acrylic type adhesive resin (glass transition temperature = −52° C.) | 10 parts |
| Polyisocyanate | 2 parts |
| Toluene | 44 parts |
| Methyl ethyl ketone | 44 parts |

(Experiment Example E-3)

A 6.0 μm thick polyethylene terephthalate film of which back surface had been supplied with a slip layer, was used as a substrate film. On the surface of the substrate film, the ink composition No. 7 used in Experiment Example B-3 was applied in a coating amount of 2.0 $g/m^2$ (solid content) to form an ink layer, whereby a thermal transfer sheet was prepared.

Further, an adhesive having the following composition was applied onto a 150 μm thick cellulose triacetate sheet by a gravure coating method in a coating amount of 0.5 $g/m^2$ (after drying), and then the resultant coating was dired. The resultant cellulose triacetate sheet was bonded to the ink layer of the above thermal transfer sheet at a nip temperature of 50° C. and a nip pressure of 5 $Kg/cm^2$, whereby a co-winding type thermal transfer sheet according to the present invention was obtained.

| Adhesive Composition | |
|---|---|
| Acrylic type adhesive resin (glass transition temperature = −60° C.) | 20 parts |
| Polyisocyanate | 1 part |
| Toluene | 44 parts |
| Methyl ethyl ketone | 44 parts |

(Comparative Example E-1)

A thermal transfer sheet of Comparative Example was prepared in the same manner as in Experiment Example E-1 except that an adhesive containing no crosslinking agent was used as the adhesive instead of that used in Experiment Example E-1.

Each of the thermal transfer sheets of Experiment Examples E-1 to E-3 and Comparative Example E-1 prepared above was loaded into a large size printer to effect printing operation and thereafter the transparent resin sheet was peeled from the above thermal transfer sheet. As a result, it was found that the surfaces of the resultant resin sheet obtained from Experiment Examples E-1 to E-3 were not tacky, but the entire surface of the resultant resin sheet obtained from Comparative Example E-1 was tacky.

Experiment Example F (Experiment Example F-1)

A 4.5 μm thick polyethylene terephthalate film of which back surface had been supplied with a slip layer, was used as a substrate film. On the surface of the substrate film, the ink composition No. 5 used in Experiment Example B-1 was applied in a coating amount of 4.0 $g/m^2$ (solid content) to form an ink layer.

Further, a temporary adhesive No. 1 used in Experiment Example A was applied onto the above ink layer by a gravure coating method in a coating amount of 0.5 $g/m^2$ (after drying), and thereafter a 100 μm thick polyester sheet having a surface resistivity of $4.5\times10^8$ Ω·cm was bonded to the resultant product at a nip temperature of 50° C. and a nip pressure of 5 $Kg/cm^2$, whereby a co-winding type thermal transfer sheet according to the present invention was obtained.

(Experiment Example F-2)

A substrate film which was the same as that used in Experiment Example F-1 was used. Onto the substrate film, the ink composition No. 6 used in Experiment Example B-2 was applied in a coating amount of 2.0 $g/m^2$ to form an ink layer.

Further, a temporary adhesive layer was formed on the above ink layer in the same manner as in Experiment Example F-1, and thereafter a 120 μm thick polypropylene sheet having a surface resistivity of $5\times10^9$ Ω·cm was similarly bonded to the resultant product, whereby a co-winding type thermal transfer sheet according to the present invention was obtained.

(Experiment Example F-3)

A substrate film which was the same as the substrate No. 3 used in Experiment Example A-3 was used. Onto the substrate film, the ink composition No. 3 used in Experiment Example A-3 was applied in a coating amount of 2.0 $g/m^2$ and dried at 60° to 70° C. to form an ink layer.

Further, a temporary adhesive layer was formed on the above ink layer in the same manner as in Experiment Example F-1, and thereafter a 150 μm thick cellulose triacetate sheet having a surface resistivity of $1\times10^9$ Ω·cm was similarly bonded to the resultant product, whereby a co-winding type thermal transfer sheet according to the present invention was obtained.

(Experiment Example F-4)

An ink layer was formed by applying the ink composition No. 5 in the same manner is in Experiment Example F-1. Then, a temparary adhesive having the following composition was applied onto the resultant ink layer by a gravure-coating method so as to provide a coating amount of 1 $g/m^2$ (after drying). Thereafter, the resultant coated product and a 75 μm-thick polyester film (surface resistivity=$4.5\times10^8$ Ω·cm) were bonded to each other at a nip temperature of 50° C. under a nip pressure of 5 $kg/m^2$, whereby a co-winding type thermal transfer sheet according to the present invention was obtained.

| Temporary adhesive composition | |
|---|---|
| Vinyl chloride/Vinyl acetate copolymer (solid content = 40%) | 20 parts |
| Toluene/MEK (1/1) | 80 parts |

(Experiment Example F-5)

An ink layer was formed by applying the ink composition No. 5 in the same manner is in Experiment example F-1. Then, a temporary adhesive having the following composition was applied onto the resultant ink layer by a gravure coating method so as to provide a coating amount of 1 g/m$^2$ (after drying). Thereafter, the resultant coated product and a 75 μm-thick polyethylene terephthelate film (surface resistivity=$3.5\times10^9$ Ω·cm) were bonded to each other at a nip temperature of 50° C. under a nip pressure of 5 kg/m$^2$, whereby a co-winding type thermal transfer sheet according to the present invention was obtained.

| Temporary adhesive composition | |
|---|---|
| Polyester type resin (solid content = 30%) | 20 parts |
| Toluene/MEK (1/1) | 80 parts |

(Experiment Example F-6)

An ink layer was formed by applying the ink composition No. 5 in the same manner is in Experiment Example F-1. Then, the temporary adhesive used in Experiment Example F-5 was applied onto the resultant ink layer by a gravure-coating method so as to provide a coating amount of 1 g/m$^2$ (after drying). Thereafter, the resultant coated product and a 90 μm-thick tracing paper (Yupo TPG, surface resistivity=$9\times10^9$ Ω·cm, light transmittance in the wavelength of 500 to 600 nm=45 to 55%) were bonded to each other at a nip temperature of 50° C. under a nip pressure of 5 kg/m$^2$, whereby a co-winding type thermal transfer sheet according to the present invention was obtained.

(Comparative Example F-1)

A thermal transfer sheet of Comparative Example was prepared in the same manner as in Experiment Example F-1 except polyester sheet (surface resistivity=above $10^{13}$ Ω·cm) which had not been subjected to an antistatic treatment.

Each of the thermal transfer sheets of Experiment Example F-1 to F-6 and Comparative Example F-1 prepared above was separately packed and was left standing for one week in a transport car which had been driven every day. Thereafter, each of the thermal transfer sheets was taken out of the package and loaded into a large size printer so as to print a complicated chemical structural formula, and then the transparent resin sheet was peeled from the above thermal transfer sheet. As a result, it was found that the surfaces of the resultant resin sheet obtained from Experiment Examples F-1 to F-6 were not contaminated, but the entire surface of the resultant resin sheet obtained from Comparative Example F-1 was blackish.

Experiment Example G (Experiment Example G 1)

A 4.5 μm-thick polyethylene terephthalate film of which back surface had been provided with a slip layer was used as a substrate film. Onto one surface side of such a substrate film, an aqueous isopropyl alcohol emulsion of carnauba wax (40%) was applied so as to provide a coating amount of 5 g/m$^2$ (solid content), and then the resultant coating was dried at 50° to 80° C., thereby to form a separation layer. Further, onto the resultant separation layer, an ink composition having the following composition was applied by a hot-melt coating method so as to provide a coating amount of 4 g/m$^2$ (solid content), and then the resultant coating was dried at 70° to 90° C., thereby to form an ink layer.

| Ink Composition | |
|---|---|
| Carbon black | 30 parts |
| Polyethylene wax (molecula weight = 700) | 50 parts |
| Microcrystalline wax | 25 parts |
| Ethylene/vinyl acetate copolyme | 2 parts |

Further, onto the above ink layer, the temporary adhesive No. 1 used in Experiment Example A was applied by a gravure coating method so as to provide a coating amount of 0.5 g/m$^2$ (after drying), and the resultant coated product and a tracing paper (basis weight=90 g/m$^2$) on which a 0.1 μm-thick adhesive layer had been formed by the application of the following adhesive composition, were bonded to each other at a nip temperature of 50° C. under a nip pressure of 5 kg/m$^2$, whereby a co-winding type thermal transfer sheet according to the present invention was obtained.

| Adhesive composition | |
|---|---|
| Vinyl chloride/vinyl acetate copolyme (solid content = 35%, glass transition point = 67° C.) | 30 parts |
| Linear polyester resin (solid content = 40%, glass transition point = 95° C.) | 30 parts |
| Toluene/methyl ethyl ketone (1/1) | 500 parts |

(Experiment Example G-2)

A co-winding type thermal transfer sheet according to the present invention was prepared in the same manner as in Experiment Example G-1 except that a 75 μm-thick polyethylene terephtalate (PET) film (Lumirror T-60, mfd. by Toray K. K.) was used instead of the tracing paper used in Experiment Example G-1.

(Experiment Example G-3)

A co-winding type thermal transfer sheet according to the present invention was prepared in the same manner as in Experiment Example G-2 except that a surface treated PET film which was the same as the PET film (Lumirror T-60) used in Experiment Example G-2 but was provided with a coating layer of a polyester type resin (0.3 g/m$^2$) on the surface to be provided with the adhesive layer, was used instead of the PET film (Lumirror T-60) used in Experiment Example G-2.

(Experiment Example G-4)

A co-winding type thermal transfe sheet according to the present invention was prepared in the same manner as in Experiment Example G-2 except that an adhesive having the following composition was used insted of the adhesive used in Experiment Example G-2.

| Adhesive composition | |
|---|---|
| Polyester type adhesive | 30 parts |
| MEK | 10 parts |
| Toluene | 10 parts |

-continued

| Adhesive composition | |
|---|---|
| Ethyl acetate | 50 parts |

(Comparative Example G-1)

A thermal transfer sheet of Comparative Example was prepared in the same manner as in Experiment Example G-1 except that an adhesive layer was not formed.

(Comparative Example G-2)

A thermal transfer sheet of Comparative Example was prepared in the same manner as in Comparative Example C-1 in Comparative Example C By use of each of the thermal transfer sheets of Experiment Example G-1 to G-4 and Comparative Examples G-1 to G-2 prepared above, images were formed by means of a large size plotter. With respect to each of the resultant images, wear resistance was evaluated in the following manner.

Thus, a load of 300 g was applied to an iron ball having a diameter of 10 mm, and the ball was disposed on the image while reciprocating the ball 20 times at a speed of 6000 mm/min by means of a device HEIDON-14. After such a treatment, the state of peeling in the image was evaluated. The thus obtained results are shown in the following Table 5.

TABLE 5

| Thermal transfer sheet | Resistance to scratch |
|---|---|
| Experiment Example G-1 | Δ |
| Experiment Example G-2 | ○ |
| Experiment Example G-3 | ○ |
| Experiment Example G-4 | ○ |
| Comparative Example G-1 | X |
| Comparative Example G-2 | X |

○: No peeling was observed in the ink layer.
Δ: Peeling was somewhat observed in the ink layer.
X: Peeling of the ink layer was considerably observed.

Experiment Example H (Experiment Example H-1)

The following ink composition was applied onto the surface of the substrate No. 1 used in Experiment Example A-1, in a coating amount of 4 $g/m^2$ (solid content) and the resultant coating was dried at 60° to 70° C. to form an ink layer. The resultant ink layer of the thus formed thermal transfer sheet had a linear transmittance of 45%.

| Ink composition | |
|---|---|
| Carnauba wax (solid content = 40%) | 50 parts |
| Ethylene/vinyl acetate copoplymer emulsion (solid content = 40%) | 30 parts |
| Transparent red pigment aqueous dispersion (solid content = 40%) | 20 parts |

Further, a temporary adhesive No. 1 used in Experiment Example A-1 was applied onto the above ink layer by a gravure coating method in a coating amount of 0.5 $g/m^2$ (after drying). Thereafter, a polyester sheet as an OHP sheet (trade name: My Pet, mfd. by Toray K. K., thickness: 25 μm, haze: 73) was bonded to the above product at a nip temperature of 50° C. and a nip pressure of 5 $Kg/cm^2$, whereby a co-winding type thermal transfer sheet according to the present invention was obtained.

(Experiment Example H-2)

A co-winding type thermal transfer sheet according to the present invention was prepared in the same manner as in Experiment Example H 1 except for using a transparent yellow pigment instead of the red pigment used in Experiment Example H-1. The resultant ink layer of the thus formed thermal transfer sheet had a linear transmittance of 65%.

(Experiment Example H-3)

A co-winding type thermal transfer sheet according to the present invention was prepared in the same manner as in Experiment Example H-1 except for using a transparent blue pigment instead of the red pigment used in Experiment Example H-1. The resultant ink layer of the thus formed thermal transfer sheet had a linear transmittance of 60%.

(Experiment Example H-4)

A co-winding type thermal transfer sheet according to the present invention was prepared in the same manner as in Experiment Example H-1 except no pigment was used in the ink composition and a transparent polyester film (trade name: T-60, mfd. by Toray K. K., thickness: 75 μm) onto which a coating liquid having the following composition was applied by means of a bar coater in a coating amount of 3 $g/m^2$ (after drying) was used as the OHP sheet. The resultant ink layer of the thus formed thermal transfer sheet had a linear transmittance of 88%.

| Coating liquid composition | |
|---|---|
| Acrylic resin (BR-85, mfd. by Mitsubishi Rayon K.K.) | 10 parts |
| Teflon filler (Rubron L 2, mfd. by Daikin Kogyo K.K.) | 1 part |
| Methyl ethyl ketone | 84 parts |

By use of each of the thermal transfer sheets of Experimental Examples H-1 to H-4 prepared above, printing was effected under the following printing conditions, and the resultant images were projected on a white screen by means of an OHP device (trade name: Overhead Projector Model 007, mfd. by Sumitomo 3M K.K.) in a light (or bright) daytime room. As a result, the following results were obtained.

Printing condition

Equipment used for such a purpose: A simulator (mfd. by Toshiba K.K.) equipped with a thin film type thermal head.

Printing energy: 0.4 mJ/dot (constant)

Printing pattern: Facsimile Test Chart No. 2 [mfd. by Gazo Denshi Gakkai (Image and Electronics Society)]

Printing results

Experiment Example H-1: A clear red image was obtained.

Experiment Example H-2: A clear yellow image was obtained.

Experiment Example H-3: A clear blue image was obtained.

Experiment Example H-4: A clear white image (or white dropout image) was obtained.

Experiment Example I (Experiment Example I-1)

The ink composition No. 1 used in Experiment Example A-1, was applied onto the surface of the substrate No. 1 used in Experiment Example A-1, in a coating amount of 4 $g/m^2$ (solid content), and the resultant coating was dried at 60° to 70° C. to form an ink layer.

Further, a temporary adhesive No. 1 used in Experiment Example A-1 was applied onto the above ink layer by a gravure coating method in a coating amount of 0.5 $g/m^2$ (after drying). Thereafter, a polyester woven fabric was bonded to the above coated product in a coating amount of 0.5 $g/m^2$ (after drying) at a nip temperature of 50° C. and a nip pressure of 5 $Kg/cm^2$, whereby a co-winding type thermal transfer sheet according to the present invention was obtained.

(Experiment Example I-2)

The ink composition No. 2 used in Experiment Example A-2, was applied onto the surface of the substrate No. 2 used in Experiment Example A-2, in a coating amount of 2.0 $g/m^2$ (solid content), and the resultant coating was dried at 60° to 70° C. to form an ink layer.

Further, a temporary adhesive layer was formed on the above ink layer in the same manner as in Experiment Example I-1. Thereafter, a mixed fabric comprising cotton and polyester was bonded to the above coated product whereby a co-winding type thermal transfer sheet according to the present invention was obtained.

(Experiment Example I-3)

The ink composition No. 3 used in Experiment Example A-3, was applied onto the surface of the substrate No. 3 used in Experiment Example A-3, in a coating amount of 2.0 $g/m^2$ (solid content), and then the resultant coating was dried at 60° to 70° C. to form an ink layer.

Further, a temporary adhesive layer was formed on the above ink layer in the same manner as in Experiment Example I-1. Thereafter, a non-woven fabric comprising polypropylene was bonded to the above coated product, whereby a co-winding type thermal transfer sheet according to the present invention was obtained.

Each of the thermal transfer sheets of Experiment Examples prepared above was loaded in a large size printer so as to print large size characters to be used for a funeral, and then the fabric was peeled from the thermal transfer sheet. As a result, well shaped characters which were the same as those written by use of India ink and a brush could easily be provided in a short period of time.

(Experiment Example I-4)

A sealing liquid having the following composition was applied onto the polyester woven fabric used in Experiment Example I-1 in a coating amount of 5 $g/m^2$ and the resultant coating was dried so as to subject the woven fabric to a sealing treatment. Then, by use of the resultant treated fabric, a co-winding type thermal trasnfer sheet was prepared in the same manner as in Experiment Example I-1 and printing was effected by use of the thus prepared thermal transfer sheet in the same manner as in Experiment Example I-1. As a result, no defect or dropout was observed at all in the case of the transferred images provided by Experiment Example I-4, while such a defect or dropout was partially observed in a portion corresponding to a low printing pressure in the case of the transferred images provided by Experiment Example I-1.

| Sealing liquid composition | |
|---|---|
| Acrylic emulsion (solid content = 25%) | 100 parts |
| Talc | 20 parts |
| Titanium oxide | 5 parts |
| Water | 50 parts |

(Experiment Example I-5)

A sealing liquid having the following composition was applied onto the mixed fabric used in Experiment Example I-2 in a coating amount of 10 $g/m^2$ and the resultant coating was dried so as to subject the mixed fabric to a sealing treatment. Then, by use of the resultant treated fabric, a co-winding type thermal transfer sheet was prepared in the same manner as in Experiment Example I-2 and printing was effected by use of the thus prepared thermal transfer sheet in the same manner as in Experiment Example I-2. As a result, no defect or dropout was observed at all in the case of the transferred images provided by Experiment Example I-5, while such a defect or dropout was partially observed in a portion corresponding to a low printing pressure in the case of the transferred images provided by Experiment Example I-2.

| Sealing liquid composition | |
|---|---|
| Polyvinyl acetate emulsion (solid content = 30%) | 100 parts |
| Calcium carbonate | 20 parts |
| Water soluble fluorescent brightening agent | 1 part |
| Water | 50 parts |

(Experiment Example I-6)

A sealing liquid having the following composition was applied onto the polypropylene non-woven fabric used in Experiment Example I-3 in a coating amount of 15 $g/m^2$ and the resultant coating was dried so as to subject the polypropylene non-woven fabric to a sealing treatment. Then, by use of the resultant treated fabric, a co-winding type thermal transfer sheet was prepared in the same manner as in Experiment Example I-3 and printing was effected by use of the thus prepared thermal transfer sheet in the same manner as in Experiment Example I-3. As a result, no defect or dropout was observed at all in the case of the transferred images provided by Experiment Example I-6, while such a defect or dropout was partially observed in a portion corresponding to a low printing pressure in the case of the transferred images provided by Experiment Example I-3.

| Sealing liquid composition | |
|---|---|
| Partially saponified polyvinyl alcohol aqueous solution (solid content = 15%) | 100 parts |
| Precipitated barium sulfate | 25 parts |
| Water soluble fluorescent brightening agent | 1 part |
| Water | 50 parts |

(Experiment Example I-7)

A 4.5 μm-thick polyethylene terephthalate film of which back surface had been provided with a slip layer was used as a substrate film. Onto one surface side of such a substrate film, a matting agent comprising a polyethylene type resin and carbon was applied so as to provide a coating amount of 0.4 $g/m^2$ (solid content) and then the resultant coating was dried at 70° to 90° C. thereby to form a mat layer. Further, onto the resultant mat layer, an ink composition having the following composition was applied so as to provide a coating amount of 5.0 g/m$^2$ (solid content), thereby to form an ink layer.

| Ink Composition | |
|---|---|
| Carbon black | 21 parts |
| Paraffin wax | 44 parts |
| Mierocrystalline wax | 28 parts |
| Carnauba wax | 12 parts |
| Ethylene/vinyl acetate copolyme | 12 parts |
| Microcrystalline wax | 28 parts |

(the above ink was prepared by melt kneading these components by means of an attritor at 120° C. for 4 hours.)

Further, onto the above ink layer, a temporary adhesive having the following compostion was applied by a gravure coating method so as to provide a coating amount (after drying) of 0.3 g/m$^2$ to form an adhesive layer. Onto the thus formed adhesive layer, a non-woven fabric (trade name: Taibek, mfd. by Du Point) was bonded at a nip temperature of 40° C. under a nip pressure of 5 kg/m$^2$, and the resultant laminate was formed into a roll, whereby a co-winding type thermal transfer sheet according to the present invention was obtained.

| Temporary adhesive compostion | |
|---|---|
| Acrylic type adhesive particle aqueous dispersion (solid content = 40%, Tg: −58° C.) | 10 parts |
| Carnauba wax aqueous dispersion (solid content = 40%, melting point = 83° C.) | 20 parts |
| Water | 30 parts |
| Isopropanol | 60 parts |

Experiment Example J (Experiment Example J-1)

A 6.0 μm-thick polyethylene terephthalate film of which back surface had been provided with a slip layer was used as a substrate film. An ink composition having the following composition was applied onto one side surface of the substrate film in a coating amount of 4 g/m$^2$, thereby to form an ink layer.

| Ink composition | |
|---|---|
| Carbon black | 15 parts |
| Ethylene/vinyl acetate copolymer | 8 parts |
| Paraffin wax | 50 parts |
| Carnauba wax | 25 parts |

(The ink composition was prepared by melt kneading the above component by means of an attritor at 120° C. for 4 hours.)

Further, a temporary adhesive having following composition was applied onto the above ink layer by a gravure coating method in a coating amount of 0.5 g/m$^2$ (after drying). Then, a thermal color-developing paper (dye: crystal violet lactone, color developer: 4,4'-isopropylidene diphenyl) was bonded to the above coated product at a nip temperature of 50° C. and a nip pressure of 5 Kg, whereby a co-winding type thermal transfer sheet according to the present invention was obtained.

| Temporary adhesive composition | |
|---|---|
| Acrylic type adhesive particle aqueous dispersion (solid content = 40%, glass transition temp. = −70° C., particle size = 3 to 10 μm) | 10 parts |
| Acrylic type resin aqueous dispersion (solid content = 20%., glass transition temp. = −85° C., particle size = 0.2 to 0.3 μm) | 15 parts |
| Carnauba wax aqueous dispersion (solid content = 40%, melting point 83° C.) | 15 parts |
| Water | 10 parts |
| Isopropanol | 30 parts |

(Experiment Examples J-2 to J-4)

Three species of thermal transfer sheets according to the present invention were prepared in the same manner as in Experiment Example J-1 except that the composition of the temporary adhesive (wt.ratio) relating to the respective dispersions were changed as shown in the following Table 6.

(Experiment Example J-5)

A co-winding type thermal transfer sheet according to the present invention was prepared in the same manner as in Experiment Example J-1 except that an ink composition having the following composition was used instead of the ink composition used in Experiment Example J-1; the composition of the temporary adhesive (wt.ratio) was changed as shown in the following Table 6; and a red color developing paper (dye: 3-diethylamino-5-methyl-7-chlorofluoran, color developer: 4,4'-isopropylidene diphenol) was used instead of the color developing paper used in Experiment Example J-1.

| Ink composition | |
|---|---|
| Blue azo pigment | 17 parts |
| Ethylene/vinyl acetate copolymer | 10 parts |
| Paraffin wax | 50 parts |
| Carnauba wax | 24 parts |

(The ink composition was prepared by melt kneading the above component by means of an attritor at 120° C. for 4 hours.)

TABLE 6

| | Experiment Example | | | | |
|---|---|---|---|---|---|
| Component | J-1 | J-2 | J-3 | J-4 | J-5 |
| Adhesive particles | 2 | 1 | 2 | 4 | 2 |
| Resin particles | 1.5 | 1 | 1 | 1 | 1 |
| Wax particles | 3 | 2 | 3 | 4 | 1 |

(Comparative Example J-1)

A thermal transfer sheet of Comparative Example was prepared in the same manner as in Experiment Example J-1 except that the adhesive particle dispersion used in Experiment Example J-1 was alone used as the temporary adhesive instead of that used in Experiment Example J-1.

(Comparative Example J-2)

A thermal transfer sheet of Comparative Example was prepared in the same manner as in Experiment Example J-1 except that the adhesive particles and the resin particles (wt.ratio=1:1) used in Experiment Example J-1 were used as the temporary adhesive instead of that used in Experiment Example J-1 and no wax was used.

(Comparative Example J-3)

A thermal transfer sheet of Comparative Example was prepared in the same manner as in Experiment Example J-1 except that the temporary adhesive layer was formed by use of polyvinyl alcohol.

(Comparative Example J-4)

A thermal transfer sheet of Comparative Example was prepared in the same manner as in Experiment Example J-1 except that the temporary adhesive layer was formed by use of polyurethane type adhesive.
(Each of the thermal transfer sheet of Comparative Examples prepared above had a temporary adhesive layer having a thickness of 0.5 g/m$^2$).

With respect to each of the thermal transfer sheets of Experiment Examples J-1 to J-5 and Comparative Examples J-1 to J-4 prepared above, the adhesion strength between the ink layer of the thermal transfer sheet and the thermal color developing paper was measured. The thus obtained results are shown in the following Table 7.

In Table 7, the symbol ○ denotes a case wherein the thermal transfer sheet and the thermal color-developing paper were not easily peeled from each other even when left standing for a predetermined period of time; and were easily peeled from each other by use of a finger tip after the printing operation; and no ground staining was observed on the paper after the printing operation. The symbol X denotes a case wherein the thermal transfer sheet and the thermal color-developing paper were spontaneously peeled from each other when left standing for a predetermined period of time; or ground staining etc., occurred on the paper after the printing operation.

In consideration of these results, it was found that the adhesion strength might preferably be in the range of 300 to 1500 g, particularly preferably in the range of 400 to 800 g.

Such an adhesive strength was measured by cutting a sample having a width of 25 mm and a length of 55 mm, and subjecting the sample to measurement by means of sliding friction meter (HEIDON-14, mfd. by Shinto Kagaku K. K.) at a pulling speed of 1800 mm/min.

TABLE 7

| Thermal transfer sheet | Adhesive strength | Evaluation | Remarks |
|---|---|---|---|
| Experiment Example J-1 | 440 | ○ | Good |
| Experiment Example J-2 | 310 | Δ | *2 |
| Experiment Example J-3 | 510 | ○ | Good |
| Experiment Example J-4 | 630 | ○ | Good |
| Experiment Example J-5 | 1200 | ○ | Good |
| Comparative Example J-1 | ≧2000 | X | *3 |
| Comparative Example J-2 | ≧2000 | X | *4 |
| Comparative Example J-3 | | *1, *5 | |
| Comparative Example J-4 | | *1, *6 | |

*1: The adhesion strength was not measured.
*2: The thermal transfer sheet was somewhat liable to be peeled from the thermal color-developing paper.
*3: The ink layer was transferred to the paper.
*4: The resultant resolution and the ink cutting were poor.
*5: The thermal transfer sheet was easily peeled from the thermal color-developing paper. The humidity resistance thereof was poor.
*6: The initial tackiness was great, and blocking occurred.

Usage Example 1

By use of each of the co-winding type thermal transfer sheet of Experiment Examples J-1 to J-4 prepared above, printing was effected at intervals of one line while a supply time of energy to a thermal head was 1200 μsec., and then printing was effected on the non printed portions while a supply time of energy to the thermal head was 500 μsec., and the thermal transfer sheet was peeled after the completion of the printing operation. As a result, printed characters based on a black ink were formed at intervals of one line and printed characters based on a developed blue color were formed at intervals of one line, and clear printed images free of ground staining were obtained.

Usage Example 2

By use of the co-winding type thermal transfer sheet of Experiment Examples J-5 prepared above, printing was effected so that the thermal color-developing paper is caused to develop a color without transferring the ink layer, while a supply time of energy to a thermal head was 500 μsec., and then printing was effected so as to simultaneously effect the transfer of the ink layer and the color development of the thermal color-developing paper, while a supply time of energy to the thermal head was 1200 μsec., and the thermal transfer sheet was peeled after the completion of the printing operation. As a result, printed characters based on a developed blue color were formed at intervals of one line and printed character based on a black color (i.e., a color mixture of a black ink and a developed blue color) were formed at intervals of one line, and clear printed images free from ground staining were obtained.

Experiment Example K (Experiment Example K-1)

A 4.5 μm-thick polyethylene terephthalate film of which back surface had been provided with a slip layer was used as a substrate film. An ink composition having the following composition was applied onto one side surface of the substrate film in a coating amount of 5 g/m$^2$, thereby to form an ink layer.

| Ink composition | |
|---|---|
| Carbon black | 13 parts |
| Ethylene/vinyl acetate copolymer | 10 parts |
| Paraffin wax | 60 parts |
| Carnauba wax | 10 parts |
| Oxidized wax | 15 parts |

(The ink composition was prepared by melt kneading the above component at 120° C. for 4 hours by means of an attritor.)

Further, a temporary adhesive having following composition was applied onto the above ink layer by a gravure coating method in a coating amount of 0.5 g/m$^2$ (after drying). Separately, a background pattern of a pale color was formed on a thermal-printing surface of plain paper, and in a non-thermal-printing region thereof, a thermal-printing form and the, name of a company or corporation, an address thereof and the name of adivision and/or a section to be disposed below the thermal-printing form were printed by use of an ordinary printing process. Then, the resultant plain paper was bonded to the above coated product at a nip temperature of 50° C. and a nip pressure of 500 Kg, and the resultant laminate was cut into a letter size, whereby a thermal transfer sheet according to the present invention was obtained.

| Temporary adhesive composition | |
|---|---|
| Acrylic type adhesive resin dispersion (solid content = 40%, glass transition temp. = −58° C.) | 10 parts |
| Carnauba wax aqueous dispersion (solid content = 40%, melting point = 83° C.) | 20 parts |
| Water | 10 parts |
| Isopropanol | 20 parts |

(Experiment Example K-2)

A 4.5 μm-thick polyethylene terephthalate film of which back surface had been provided with a slip layer was used as a substrate film. An ink composition which was the same as that used in Experiment Example K-1 was applied onto one side surface of the substrate film in a coating amount of 5 $g/m^2$, thereby to form an ink layer.

Further, a temporary adhesive which was the same as that used in Experiment Example K-1 was applied onto the above ink layer by a gravure coating method in a coating amount of 0.5 $g/m^2$ (after drying). Then, plain paper which had been subjected to a printing operation in the same manner as in Experiment Example K-1 was bonded to the above coated product at a nip temperature of 50° C. and a nip pressure of 500 Kg, and the resultant laminate was cut into an A-4 size, whereby a thermal transfer sheet according to the present invention was obtained.

(Experiment Example K-3)

A 6.0 μm-thick polyethylene terephthalate film of which back surface had been provided with a slip layer was used as a substrate film. An ink composition having the following composition was applied onto one side surface of the substrate film in a coating amount of 4 $g/m^2$, thereby to form an ink layer.

| Ink composition | |
|---|---|
| Carbon black | 13 parts |
| Ethylene/vinyl acetate copolymer | 14 parts |
| Paraffin wax | 60 parts |
| Carnauba wax | 10 parts |
| Oxidized wax | 15 parts |

(The ink composition was prepared by melt kneading the above component by means of an attritor at 120° C. for 4 hours.)

Further, a temporary adhesive which was the same as that used in Experiment Example K-1 was applied onto the above ink layer by a gravure coating method in a coating amount of 0.5 $g/m^2$ (after drying). Then, plain paper which had been subjected to a printing operation in the same manner as in Experiment Example K-1 was bonded to the above coated product at a nip temperature of 50° C. and a nip pressure of 500 Kg, and the resultant laminate was cut into a B-5 size, whereby a thermal transfer sheet according to the present invention was obtained.

(Experiment Example K-4)

A 4.5 μm-thick polyethylene terephthalate film of which back surface had been provided with a slip layer was used as a substrate film. Onto one surface side of such a substrate film, a matting agent comprising a polyethylene type resin and carbon was applied so as to provide a coating amount of 0.4 $g/m^2$ (solid content) and then the resultant coating was dried at 70° to 90° C. thereby to form a mat layer.

Further, onto the resultant mat layer, an ink composition having the following composition was applied so as to provide a coating amount of 5.2 $g/m^2$ (solid content), thereby to form an ink layer.

| Ink composition | |
|---|---|
| Carbon black | 13 parts |
| Paraffin wax | 60 parts |
| Microcrystalline wax | 15 parts |
| Carnauba wax | 10 parts |
| Ethylene/vinyl acetate copolymer | 10 parts |

(The above ink was prepared by melt kneading these componets by means of an attritor at 120° C. for 4 hours)

Further, onto the above ink layer, the temporary adhesive used in Experiment Example K-1 was applied by a gravure coating method so as to provide a coating amount (after drying) of 0.3 $g/m^2$ to form an adhesive layer. Onto the thus formed adhesive layer, a plain paper wherein the printing surface had been provided with a wood grain-like background pattern by use of a grovure printing method was bonded at a nip temperature of 40° C. under a nip pressure of 5 $kg/m^2$ and the resultant laminate was formed into a roll, whereby a co-winding type thermal transfer sheet according to the present invention was obtained.

(Comparative Example K-1)

A thermal transfer sheet of Comparative Example was prepared in the same manner as in Experiment Example K-1 except that a similar white plain paper without the printed pattern was used instead of the plain paper used in Experiment Example K-1.

The thermal transfer sheets of Experiment Example K-1 to K-4 and Comparative Example K-1 prepared above had just the same appearances and therefore these could not be discriminated from each other when observed with the naked eyes. In addition, the adhesion strength between the ink layer of the above thermal transfer sheet and the paper was such that they were not easily separated from each other even after left standing for a predetermined period of time, were easily separated from each other after the printing operation by use of a finger tip, and the thus separated paper had no ground staining. When images corresponding to the same information was printed by using each of the above thermal transfer sheets under the same thermal printing conditions, excellent images were formed in any of these cases. However, the thus obtained printed matters were clearly discriminated from each other on the basis of the presence of the printed pattern which had been formed on the thermal printing surface in advance.

What is claimed is:

1. A thermal transfer sheet comprising:

a substrate film, one side surface of which is provided with a heat-fusible ink layer comprising a pigment and a particulate binder, and a tracing paper peelably bonded to the heat-fusible ink layer by the medium of an adhesive layer.

2. A thermal transfer sheet according to claim 1, wherein the particulate binder comprises a particulate wax and a particulate thermoplastic resin.

3. A thermal transfer sheet according to claim 2, wherein the particulate thermoplastic resin comprises an acrylic type resin.

4. A thermal transfer sheet according to claim 1, wherein the heat-fusible ink layer contains heat resistant particles.

5. A thermal transfer sheet according to claim 1, which further comprises a wax layer which is disposed between the substrate film and the heat-fusible ink layer and comprises a particulate wax.

6. A thermal transfer sheet according to claim 1, wherein the tracing paper comprises a paper impregnated with a resin which has a light beam transmittance of 40 to 65% in the wavelength range of 500 to 600 nm.

7. A thermal transfer sheet according to claim 1, wherein the tracing paper comprises a synthetic paper including minute voids.

8. A thermal transfer sheet according to claim 1, wherein the tracing paper has a surface which is to be subjected to a printing operation and has been provided with a printed image in advance.

9. A thermal transfer sheet, comprising:

a substrate sheet, one side surface of which is provided with a heat-fusible ink layer; and a transfer-receiving material which is peelably bonded to the heat-fusible ink layer by the medium of an adhesive layer;

wherein the heat-fusible ink layer comprises a pigment and a particulate binder.

10. A thermal transfer sheet according to claim 9, wherein the transfer receiving material comprises a tracing paper.

11. A thermal transfer sheet according to claim 9, wherein the transfer-receiving material comprises a sheet having no liquid absorbing property.

12. A thermal transfer sheet according to claim 9, wherein the transfer-receiving material comprises a transparent resin sheet.

13. A thermal transfer sheet according to claim 9, wherein the transfer receiving material comprises a synthetic paper including minute voids.

14. The thermal transfer sheet according to claim 1 or 9, wherein the adhesive layer has an adhesive strength in a range of 300 to 2,000 and a width of 25 mm.

15. The thermal transfer sheet according to claim 1 or 9, wherein the adhesive layer contains an adhesive resin having a glass transition temperature in a range of −90° to −60° C.

* * * * *